(12) United States Patent
Riek et al.

(10) Patent No.: US 12,325,128 B2
(45) Date of Patent: Jun. 10, 2025

(54) METHOD FOR OPERATING A COMPUTER-BASED INVENTORY OF HARDWARE MODULES OF A ROBOTIC SYSTEM

(71) Applicant: Festo SE & Co. KG, Esslingen (DE)

(72) Inventors: Alfons Riek, Weilheim (DE); Curt-Michael Stoll, Esslingen (DE); Hans Klingel, Stuttgart (DE); Marcel Aeschlimann, Ligerz (CH); Samuel Malzach, Evilard (CH); Christian Schmid, Feusisberg (CH); Christoph Berger, Oberburg (CH); Carole Chapelat, Biel (CH); Judith Wimmer, Biel (CH); Ivo Aschwanden, Zürich (CH); Martin Helmer, Zürich (CH); Markus Andreas Muller, Zürich (CH); Peter Barmettler, Bern (CH)

(73) Assignee: Festo SE & Co. KG, Esslingen (DE)

( * ) Notice: Subject to any disclaimer, the term of this patent is extended or adjusted under 35 U.S.C. 154(b) by 268 days.

(21) Appl. No.: 17/903,213

(22) Filed: Sep. 6, 2022

(65) Prior Publication Data

US 2023/0070428 A1    Mar. 9, 2023

Related U.S. Application Data

(62) Division of application No. 16/759,613, filed as application No. PCT/EP2018/079324 on Oct. 25, 2018, now abandoned.

(30) Foreign Application Priority Data

Oct. 27, 2017 (EP) .................................... 17198994

(51) Int. Cl.
| | | |
|---|---|---|
| *B25J 9/16* | (2006.01) | |
| *B25J 9/08* | (2006.01) | |
| *G06Q 10/0631* | (2023.01) | |

(52) U.S. Cl.
CPC ................. *B25J 9/161* (2013.01); *B25J 9/08* (2013.01); *B25J 9/1605* (2013.01); *B25J 9/1653* (2013.01);

(Continued)

(58) Field of Classification Search
None
See application file for complete search history.

(56) References Cited

U.S. PATENT DOCUMENTS

| | | |
|---|---|---|
| 7,143,007 B2 | 11/2006 | Long et al. |
| 9,465,384 B1 | 10/2016 | Jain et al. |

(Continued)

FOREIGN PATENT DOCUMENTS

| | | | | |
|---|---|---|---|---|
| EP | 2136322 A1 * | 12/2009 | ............. | G06Q 10/06 |
| WO | 2016/014774 A1 | 1/2016 | | |
| WO | 2017/149500 A1 | 9/2017 | | |

OTHER PUBLICATIONS

Duff et al, "Evolution of polybot: A modular reconfigurable robot.", 2001, Proc. of the Harmonic Drive Intl. Symposium, Nagano, Japan, pp. 1-6 (Year: 2001).*

(Continued)

*Primary Examiner* — David Earl Ogg
(74) *Attorney, Agent, or Firm* — Hoffmann & Baron, LLP

(57) ABSTRACT

A method for supporting designing and operation of a robotic system includes operating a computer-based Inventory configured to operate in a robotic system having Hardware Modules to perform a task, the Inventory including Hardware Module Descriptions including a unique identifier, a description of physical characteristics, a current status and historical data the Hardware Module. The method including the steps of (Continued)

collecting status data of the Hardware Module;

collecting operating data representing usage of the Hardware Module and updating the historical data accordingly;

and at least one of the steps of scheduling maintenance actions to be performed on the Hardware Module;

deriving or modifying, based on the operating data, historical data that is associated with a type of the Hardware Module.

3 Claims, 4 Drawing Sheets

(52) U.S. Cl.
CPC ........... *B25J 9/1661* (2013.01); *B25J 9/1692* (2013.01); *G06Q 10/06311* (2013.01)

(56) References Cited

U.S. PATENT DOCUMENTS

| | | | | |
|---|---|---|---|---|
| 10,052,763 | B1* | 8/2018 | Nusser | B25J 9/1692 |
| 10,372,115 | B2* | 8/2019 | Das | B23Q 37/005 |
| 2004/0073468 | A1 | 4/2004 | Vyas et al. | |
| 2012/0150345 | A1* | 6/2012 | Baltes | G05D 1/0274 |
| | | | | 700/245 |
| 2015/0239127 | A1 | 8/2015 | Barajas et al. | |
| 2015/0336270 | A1* | 11/2015 | Storr | B25J 9/1674 |
| | | | | 901/1 |
| 2016/0176043 | A1 | 6/2016 | Mishra et al. | |
| 2016/0346928 | A1* | 12/2016 | Zhang | B25J 9/1679 |
| 2017/0144304 | A1* | 5/2017 | Guerin | B25J 9/1661 |
| 2018/0246500 | A1* | 8/2018 | Becher | G05B 19/41865 |
| 2018/0348742 | A1* | 12/2018 | Byrne | G05B 19/41885 |

OTHER PUBLICATIONS

Kereluk et al., "A New Modular, Autonomously Reconfigurable Manipulator Platform", 2015, International Journal of Advanced Robotic Systems, pp. 1-15 (Year: 2015).*

* cited by examiner

METHOD FOR OPERATING A COMPUTER-BASED INVENTORY OF HARDWARE MODULES OF A ROBOTIC SYSTEM

This application is a divisional application of U.S. application Ser. No. 16/759,613, filed on Apr. 27, 2020, which is a National Stage application based on PCT/EP2018/079324, filed on Oct. 25, 2018, which claims priority to EP 17 198 994.0, filed on Oct. 27, 2017.

BACKGROUND OF THE INVENTION

The invention relates to the field of production systems, in particular to manufacturing systems comprising robots or manipulators.

In a manufacturing environment, today, manipulators are assigned to a specific tasks and cannot be easily adapted in terms of degree of freedom of movement, geometry, or of mechanical/physical capabilities to perform other kinds of tasks. Due to costs pressure, robots or manipulators are broadly used in production and companies want to maximize their ROI when buying robots. On the other hand, the popularization of robots creates the issue of recycling them, and environmental questions need to be considered. Hence, there is a strong need to
1. Increase the lifetime of the robots/manipulators.
2. Make robots/manipulators more reliable.
3. Make them more flexible in terms of performance or actions.

Generally, it is known to have robots/manipulators working together. But if they are not of the same manufacturer compatibility issues arise.

US 2004/0073468 A1 discloses a fleet management system to manage a plurality of machines aimed towards preventive maintenance of the machines. The system comprises a data repository containing status and operating data collected by sensors which is then analysed to recommend a modification in the maintenance schedule.

U.S. Pat. No. 7,143,007 B2 discloses a method to monitor the lifecycle of a component of an equipment. The duty profile of a component is a means to estimate theoretical life of the component and actual life of the component is estimated by considering the operating information of the component. An adjusted theoretical useful life is computed and a scheduled replacement need is signalled when the amount of the theoretical useful life consumed is within a replacement range of the adjusted theoretical useful life.

U.S. Pat. No. 8,533,018 B2 discloses a system to manage construction machines having plurality of components. It comprises a schedule generation unit to generate a maintenance schedule, a judgment unit to decide on the schedule based on the availability data of components, and a correction unit to correct the schedule table if it is decided by the judgement unit.

US 2014/0067108 discloses systems and methods for the dynamic control of task assignments in a fabrication process that employs a plurality of machines to fabricate a manufactured component. The solution provided includes tasks assignments to an available portion of a plurality of machines. A process variable reflecting the change of status of machines is monitored, and enables to define the portion of available machines dynamically, and to re-distribute the tasks accordingly.

U.S. Pat. No. 8,428,777 B1 discloses a method and system for distributing tasks among robotic system. It aims at optimizing execution time of a task and provides potential solutions of an alternative repartition of tasks within a group of available robotic devices based on their ranking. The ranking specifies an amount of usage of the devices over time.

WO2017/149500 A1 discloses a method for maintenance of a machine such as an ATM. Maintenance personnel is informed about maintenance operations to be performed. Historical data about e.g. type of maintenance, parts serviced, time of last maintenance can be stored in a central server. Parts can be identified by product ID.

U.S. Pat. No. 9,465,384 B1 describes a reconfigurable robotic workcell. It can be programmed by specifying tasks in terms of subtasks such as picking, moving, placing an object or applying a force. Certain parameters of subtasks can be left undefined in an offline programming phase, and be defined in a later programming phase, by interaction with the real robot in the workcell.

US 2016/0176043 A1 discloses selection of a manipulator from a group of manipulators, for performing a particular task. Selection is guided by stored data on success or failure, and time and power spent, for performing the task be each of the manipulators. The system as a whole can be considered "modular" in that several manipulators are available for use. Each manipulator by itself is however not described as being modular.

US 2015/0239127 A1 shows action planning for a robot, using a simulation module and graphic visualization. A robot environment can use sensors to determine a status of the robot and an object located in the workspace. The status is used in the simulation model, assisting a user in planning, or as input for an action planning module. Markers identifying objects or locations related to an action are superimposed on a real or simulated view of the workspace and parts.

WO 2016/014774 A1 describes cloud based robotic planning system that takes as input sensor values, a description of a task and a robot's configuration, and outputs instructions to the robot for carrying out the task. This is done on the basis of experiences made with another robot system, and simulations of the task. Simulation can take place in the cloud and/or as on-board simulation in the robot.

There is a need for a method for supporting designing and operation of a robotic system that allows for improved flexibility in design and/or construction and/or operation and/or re-use of the robotic system and its components.

SUMMARY OF THE INVENTION

It is therefore an object of the invention to create a method for supporting designing and operation of a robotic system, which overcomes the disadvantages mentioned above.

These objects are achieved by a method for supporting designing and operation of a robotic system.

In the context of the present document, it is understood that the term "robotic system" encompasses a production system and in particular a manufacturing system in which parts are manipulated and processed, e.g. by tooling and assembling. Such a system comprises robots or manipulators for handling the parts, and can comprise dedicated other machines such as machine tools, painting or welding machines etc. Thus, a robotic system can be a single manipulator, in particular a modular manipulator or robot, or a production cell, or a production plant, or even a group of geographically separated production plants.

In the method for supporting designing and operation of a robotic system, the method comprising operating a computer-based Inventory, the Inventory is configured to operate as a part of or in co-operation with a computer-based system for controlling the operation of a robotic system, the robotic system comprising one or more Hardware Modules to perform a task, the Inventory comprising a plurality of Hardware Module Descriptions, each Hardware Module Description comprising
- a unique identifier of the Hardware Module;
- a description of physical characteristics of the Hardware Module;
- a description of a current status of the Hardware Module;
- historical data describing usage of the Hardware Module;

the method comprising the steps of
- collecting status data representing the current status of the Hardware Module and updating the description of the current status accordingly;
- collecting operating data representing usage of the Hardware Module and updating the historical data accordingly;

and at least one of the steps of
- scheduling maintenance actions to be performed on the Hardware Module;
- deriving or modifying, based on the operating data, historical data that is associated with a type of the Hardware Module, wherein in particular the historical data comprises information on errors or malfunctions occurring in the Hardware Module.

A Hardware Module constitutes a smart pluggable module. A module being pluggable means that it can be connected both on a hardware level and on a software or communication level by means of a standardised interface. A module being smart means that it comprises a computing unit with data storage and data processing elements that allow the Hardware Module to, e.g. perform data processing, and with communication elements for communicating with other Hardware Modules. The computing unit can be implemented by means of a variety of hardware entities, from an embedded controller over a controlling computer to cloud based processing units.

A Hardware Module can be designed to transmit information about its internal state, history of operation etc. to the Inventory.

Hardware Modules can be configured to receive software updates and/or configuration updates in order to maintain compatibility with other Hardware Modules.

Hardware Modules can be configured to receive software upgrades for adding new functionalities. This can be data processing software for a sensor, e.g. image analysis software for a camera, or a new motor control algorithm for a manipulator module.

A Hardware Module can be
- a manipulator module.
- a central computation and command unit ("CCC") unit.
- a robotic arm or manipulator subsystem with its own control unit, typically a controlling computer that is separate from the arm itself, acting as the computing unit, and an interface unit (also referred to as "compatibiliser unit" or translator) which presents a standardised interface to other Hardware Modules. This interface makes the manipulator subsystem appear within the robotic system in essentially the same way as a modular manipulator assembly or system (see below) appears. In this way, a robot from a third party, which itself is not modular, can be integrated into the overall robotic system as one module.
- a sensor module comprising at least one sensor, and an embedded controller as the computing unit, for processing raw sensor data acquired by the sensor and communicating with other Hardware Modules, in particular for transmitting processed sensor data to other Hardware Modules.
- another device, such as a dedicated machine used in production, that can be interfaced to the CCC and be controlled and provide feedback, e.g. through a compatibiliser unit.

A Hardware Module that comprises a joint and actuator for e.g. rotary or translational movement is called an active module. A Hardware Module that has a fixed geometry or fixed geometric configuration is called passive module. A sensor module as a rule is a passive module.

The Hardware Module Descriptions can be stored in the Hardware Modules themselves, and/or in a database together with Hardware Module Descriptions from other Hardware Modules, from which the descriptions can be retrieved given the identifier of the Hardware Module The unique identifier can be an IP address or MAC address. The database can be a centralised database or a distributed database, in particular a cloud database.

As a result, the Inventory implements a library that records for each module its history and its specifications etc, which allows planning and optimising maintenance. Furthermore, information regarding the same type of Hardware Module can be exchanged for further optimisation of maintenance and for exchanging solutions when malfunctions or other problems occur.

The Inventory can be linked to an ERP and/or maintenance planning system for planning the deployment and/or maintenance of the Hardware Modules.

The term collected data shall be used to encompass status data and operating data. When stored, the collected data becomes part of the historical data.

In embodiments, the Inventory comprises process definitions, wherein each process definition is associated with a task and specifies one or more actions and/or subtasks that when executed accomplish the task, and for each action, Hardware Modules and/or Software Modules required for executing the action.

This allows to represent process knowledge in the Inventory, and provide this information to methods for designing a robotic system using the modules and/or to methods for planning operation of a robotic system.

In embodiments, the Inventory comprises descriptions of robotic assemblies, wherein a robotic assembly is a configuration of manipulator modules and the description of a robotic assembly comprises a description of the configuration.

The description of the configuration can comprise a description of the Hardware Modules or types of Hardware Modules, the geometric relation in which they are assembled, and any Software Modules that are part of the robotic assembly. By this, the robotic assembly can be linked to all the historical data of its modules. This allows the system not only to learn about the history of each Hardware Module and type of Hardware Module and draw conclusions, e.g. for planning maintenance, but also about the history of each configuration. For example, if robotic assemblies of a particular configuration repeatedly experiences failures in the same Hardware Module, this is a property of this configuration, and is relevant for all assemblies having the same configuration, e.g. for predictive maintenance.

In embodiments, the description of physical characteristics of the Hardware Module comprises one or more of mechanical, electrical and component parameters such as:

geometrical dimensions;
weight;
type of actuator;
force or torque generated by an actuator;
speed of movement of an actuator;
type of sensor;
resolution of sensor;
accuracy of sensor;
and tolerance ranges for such parameters.

The physical characteristics usually are determined by the physical construction of the Hardware Module and its components. They can remain fixed over time, or they can change. A change can be detected by sensors in the Hardware Module itself, or by interaction of the Hardware Module with other Hardware Modules—which can be manipulator modules and/or sensor modules—in particular by performing calibration routines. For each parameter, a current value can be stored, and optionally also historic data with previous values. This represents changes of the parameter over time.

In embodiments, the description of a current status of the Hardware Module comprises one or more of:
  an internal state of the Hardware Module;
  a list of other Hardware Modules that the Hardware Module is physically connected to;
  parameters of such a connection;
  a list of Software Modules currently installed on the Hardware Module;
  the geographical location of the Hardware Module;
  a list of other Hardware Modules that the Hardware Module is configured to communicate or cooperate with;
  a list of Software Modules that the Hardware Module is configured to communicate with or that the Hardware Module is associated with.

The current status represents the status data, therefore status data comprises, e.g. data on the internal state, the other Hardware Modules that the Hardware Module is physically connected to, etc. The internal state can be a temperature inside the Hardware Module, the position of a joint that is part of the Hardware Module, which in this case can be a manipulator module, etc.

The software modules associated with the Hardware Module can obviously be software that is executed on the Hardware Module, but they can also be "related" in that they process data acquired by the Hardware Module, e.g. image processing software for a hardware camera, or in that they determine data that is used in operation of the Hardware Module, e.g. calibration software that computes calibration parameters (from calibration data determined by the same Hardware Module, or from data obtained by other Hardware Modules, in particular, sensors).

In embodiments, the operating data and the historical data representing usage of the Hardware Module comprises one or more of:
  total time of operation;
  logged values of operating data;
  statistical values of operating data;
  number of cycles performed;
  types of malfunctions;
  statistics on malfunctions;
  time and/or cost for eliminating malfunctions;
  downtime caused by malfunctions;
  how a particular malfunction was eliminated;
  statistical and other values derived from other historical data;
  a log of maintenance actions.

The historical data can be derived from the operating data, and data can comprise data on when and how long a Hardware Module or components of the Hardware Module were in operation, and parameters used in their operation. For example, operating data can state when device, e.g. a motor was switched on, what power it operated at, and when it was switched off. Operating data can comprise values of physical properties, in particular mechanical or electrical properties. Mechanical properties can be forces, torques, speeds, paths travelled, etc. Electrical properties can be currents, voltages, power, etc. Operating data can be determined by the embedded controller—for parameters that are controlled by the embedded controller itself—or from sensor data obtained from the at least one sensor.

Historical data can also comprise entries that are in part or wholly generated by humans, such as how a particular malfunction was eliminated or a log of maintenance actions with the number, date, frequency of maintenance actions, and with individual steps taken during maintenance. Information about malfunctions can be generated automatically. If a Hardware Module is exchanged because of repairs or maintenance, it is replaced by a similar Hardware Module with a different identity, which is recorded by the system, either automatically or manually. If a Hardware Module is repaired but remains in place, this is recorded in its history.

In embodiments, each Hardware Module monitors and provides its characteristics regarding lifetime of replaceable components, e.g. to the central computation and command unit (CCC). It also maintains and communicates to the CCC the number of remaining operations which can be performed before the next component failure is expected. The CCC collects this information for each Hardware Module, and is able either to plan for maintenance before failure's occurrence, or to plan the replacement of relevant Hardware Modules in order to limit downtime.

The CCC can obtain information about when a component failure is expected from the inventory. Such information can be determined by analysing historical data of components of the same type.

A software module description can comprise a definition of an API (application programming interface), types or identifiers of Hardware Modules that the Software Module can interact with. Such interaction can be e.g. by the software being executed on a processor of the Hardware Module, or by being executed on another processor, but generating control commands that are input to the Hardware Module.

In embodiments, the Hardware Module Description comprises a description of a communication interface of the Hardware Module.

This description allows to establish communication with the Hardware Module. It can comprise an address under which the Hardware Module can be accessed. It can comprise an interface definition or API that defines how to access the functions provided by the Hardware Module.

In embodiments, the method for operating a computer-based Inventory comprises the steps for designing a robotic system:
  providing the Inventory with a plurality of Hardware Module Descriptions;
  providing a set of performance requirements for the robotic system;
  automatically determining, based on their physical characteristics, a set of Hardware Modules and their physical configuration in the robotic system such that the robotic system satisfies the performance requirements.

This allows to design and realise a system with one or more of the following features:

Because the selection of Hardware Modules and their configuration is determined automatically, production can be started right away, with more or less human workers in the process and with less initial investment. The robotic system can be gradually built up to increase production capacity.

Planning operation of the robotic system can be based on target tasks that are part of the performance requirements. This allows operation of the system to be flexible and to work around failures.

Allow for third-party products by providing standardised interfaces. Thus the robotic system is not limited to a priori pluggable modules.

Provide a planning and execution platform that is independent of a particular vendor—allowing to use the best or most suited hardware for each task, adapted to the tasks requirements (accuracy, speed, cost, . . . ).

The Hardware Module Descriptions can be Hardware Module Type Descriptions that describe Hardware Modules in a generic manner, i.e. with a description that is valid for all Hardware Modules of that type. This allows to perform the designing with such types, and to choose concrete Hardware Modules at a later stage. A concrete Hardware Module is an instance of a (generic) Hardware Module Type. That is, the concrete Hardware Module has its own unique identity, and a Hardware Module Description can be associated with this identity.

Nevertheless, one or more or all of the Hardware Module Descriptions can relate to concrete Hardware Modules. When designing the robotic system, these concrete Hardware Modules are considered, in some cases compared to one another, and chosen.

In embodiments, the set of Hardware Modules can be an existing robotic or production system that already exists in the physical configuration required for satisfying the performance requirements.

In this way, it is possible to use an existing facility instead of having to build a dedicated one. The Inventory thus also serves as a database describing operational systems and not only individual, unrelated Hardware Modules.

In order to cover different needs, the Hardware Modules can provide for a variety of options. This allows to optimise the robotic system depending on what are the exact needs, i.e. performance requirements are. Modules can vary according the action performed in terms of size (S, M, L), in terms of mechanical strength, in terms of materials, in terms of memory size, etc.

Thus an optimised robot for a particular task can be built up using, e.g. long life Hardware Modules with high strength for one task, medium quality modules for other, less demanding tasks. Overall, an optimised robotic system can give adequate performance for the lowest price.

Different categories of modules can be created: The most accurate are with the tighter tolerances would be class A and the broadest tolerances range would be classified E. Accuracy/tolerances range would be scaled between class A, B, C, D and E. As a top class module from class A will age and deviate from its initial tolerance range, and thus can be re-qualified as class B, C, D and E over time, and re-used for less demanding applications.

Different materials can be used, with different properties such as mechanical stability, accuracy of shape, weight, cost, chemical resistance, tightness etc.

The performance requirements can comprise a 3D space to be reached by the robotic system, a maximum load to be manipulated by the robotic system, a maximum speed and accuracy for the movement of the load, etc.

In embodiments, the step of automatically determining the set of Hardware Modules comprises the further steps of
retrieving, from the performance requirements, at least one target task to be performed by the robotic system;
retrieving, from the Inventory, a process definition that matches the target task;
and either determining, based on the process definition, a set of Hardware Modules and/or Software Modules that are associated with the process definition and are able to accomplish the target task by performing actions specified by the process definition;
or determining, based on the process definition, a set of target subtasks corresponding to the target task, and recursively repeating, for each target subtask, the steps of retrieving a matching process definition and determining associated Hardware Modules and/or Software Modules or determining subtasks.

This allows to recursively break down a target task and determine actions that accomplish the task. The basis for this are the process definitions, that by their hierarchy implicitly define a multitude of different ways to perform such a breakdown. A concrete way in which this breakdown happens depends on the parameters of the task at hand. It can also depend on events that occur during execution of a process definition, causing the execution to adapt to events.

Generally, the following terms shall be used:
A process definition specifies actions that perform a task.
A (target) task is an input to a design or planning method. A task is what the system is to accomplish, in terms of manufacturing products, and, at the highest level, independent of the hardware used to accomplish the task. The task is implemented or accomplished by performing actions according to the process definition.
A task can be defined in terms of subtasks, e.g. by a user defining the task, and thereby already performing part of the planning, and/or the task be broken down into subtasks by a planning system.

Note with regard to the term "task": in robot programming, sometimes the terms "task level" is used, as opposed to e.g. "motion command level". Here we use the term "task" mainly to denote what a system should do, i.e. a target to be accomplished. Often, of course, a task in this sense is defined at the "task level".

In embodiments, the method comprises the step of, after determining the set of Hardware Modules,
determining a refined set of Hardware Modules and Software Modules by comparing the compatibility of Hardware Modules with other Hardware Modules, and the compatibility of Hardware Modules with Software Modules, and generating a list of compatible combinations of Hardware Modules and Software Modules.

This allows to take into account interactions and dependencies between Hardware Modules and Software Modules.

In embodiments, the method comprises the step of
determining a set of compatibilisers, compatibilisers being Hardware Modules or Software Modules that enable the compatibility of Hardware Modules and/or Software Modules of the refined set that are not directly compatible.

In embodiments, the method comprises the step of, after determining the set of Hardware Modules (with or without the refining step) determining separate subsets of concrete Hardware Modules, with at least a first subset comprising concrete Hardware Modules that are available at a first geographical location, and at least a second subset comprising further concrete Hardware Modules that are available at other geographical locations. Such further Hardware Modules are typically described by associated Hardware Module Descriptions stored in the Inventory.

This allows to integrate Hardware Modules that are already present at a particular production facility (or at more than one facilities that are readily accessible) with Hardware Modules that need to be transported from other geographical locations. The choice of the two subsets can be optimised in view of costs of e.g. operating, transporting, renting or buying the Hardware Modules from the different sets. The optimisation can take the availability of the Hardware Modules in a time span for which their use is planned into account.

In embodiments, the method comprises the step of updating, in the Inventory, a current status of the concrete Hardware Modules of at least the second subset in the Inventory to reflect the fact that the concrete Hardware Modules are installed and operated as part of the robotic system having been designed, and updating historical data collected in the Inventory in accordance with operating data from these concrete Hardware Modules.

This allows to continuously update the information in the Inventory. This can also be done for Hardware Modules from the first subset in order to reflect the fact that they are installed and operated as part of the robotic system. This is on the one hand for keeping the data related to the individual Hardware Modules up to date, allowing them to be incorporated into future projects. On the other hand, information collected from several Hardware Modules of the same type can be pooled and used to improve statistical data on this type. This again improves future planning and maintenance planning for all Hardware Modules of this type.

In embodiments, one or more of the set of Hardware Modules are predetermined as being of a particular Hardware Module type and/or as being a particular concrete Hardware Module. Such a pre-selection of types or individual modules can be done by the user, or by a design system.

In embodiments,
the step of automatically determining, based on their physical characteristics, a set of Hardware Modules; and/or
the step of determining, based on the process definition, a set of Hardware Modules; and/or
the step of determining a refined set of Hardware Modules, comprises the steps of
retrieving, from the Inventory, historical data that is associated with a Hardware Module Type;
determining the set of Hardware Modules according to this historical data.

This allows to refine the planning of an individual system on the basis of aggregated information such as statistical data collected from a multitude of Hardware Modules of the same type.

In embodiments, the step of automatically determining, based on their physical characteristics, a set of Hardware Modules; and/or the step of determining separate subsets of concrete Hardware Modules, comprises the steps of
retrieving, from the Inventory, historical data that is associated with a concrete Hardware Module;
determining the set of Hardware Modules according to this historical data.

This allows to refine the planning of an individual system on the basis of history information including statistical data collected over the lifetime of each individual Hardware Module that is a candidate for being incorporated in the system. It also allows to optimise the choice of Hardware Modules for a particular system, depending on the requirements of the system. For example, if only low accuracy is required, corresponding Hardware Modules with less accuracy—as known from their history—can be used, reducing costs. Or the expected lifetime or the time until the next maintenance is due (which can depend on the task at hand) for several Hardware Modules can be matched with each other and with the size of the production run associated with the task. From the supplier perspective, the Inventory is a unique opportunity to measure the behaviour of their Hardware in different environments and to have a true understanding of the boundaries of its Hardware. It also allows to, based on the historical data, identify aspects where improvement is required. Preventive maintenance and replacement can be scheduled, taking into account the specific conditions and configuration under which the Hardware is used.

In embodiments, the step of
determining, based on the process definition, a set of Hardware Modules and/or Software Modules that are associated with the process definition comprises the steps of
retrieving, from the process definition, performance criteria that need to be satisfied by Hardware Modules and/or Software Modules that are associated with the process definition and are able to accomplish the target task, wherein each one of the performance criteria is associated with one of at least two performance classes, a higher performance class and a lower performance class;
selecting a set of Hardware Modules and/or Software Modules that satisfy the performance criteria of the higher performance class and the lower performance class;
if this set is empty, performing at least one of the steps of
indicating this to a user, and accepting input from the user to relax performance criteria of the lower performance class;
automatically relaxing one or more performance criteria of the lower performance class until the set is no longer empty.

In other words, the performance criteria of the lower performance class are relaxed either manually or automatically until the second set of Hardware Modules and/or Software Modules that satisfy the performance criteria of the higher performance class and the lower performance class is not empty.

Selecting the set of Hardware Modules and/or Software Modules that satisfy the performance criteria can be done with a known mathematical optimisation method. The underlying optimisation problem will typically be a multi-objective and multi-modal problem. Therein, the optimisation (or input) variables comprise the choice of Hardware Modules and/or Software Modules and of their parameters. The performance criteria can specify fixed boundaries that cannot be crossed, and objective functions to be minimised or maximised.

Selecting the set of Hardware Modules and/or Software Modules 4 that satisfy the performance criteria can be done, for example, with the following steps:
first selecting a first set of Hardware Modules and/or Software Modules 4 that satisfy the performance criteria of the higher performance class;
then selecting, from the first set, a second set that satisfies the performance criteria of the lower performance class;

The Inventory can be implemented and provide data for designing robotic systems with or without incorporating planning steps as part of the design process. Such planning steps, as described below, can be used to further aid in the selection of Hardware Modules:

A method for operating the robotic system, wherein the robotic system comprises a given set of concrete Hardware Modules and Software Modules, and wherein the location of the Hardware Modules in space (that is, within the robotic system and relative to other Hardware Modules of the robotic system) is known, comprises the steps for planning operation of the robotic system by maintaining a computational model of the robotic system;
inputting a target task, the target task comprising an entry status and an output status of a product that is to be manufactured by the robotic system;
retrieving a process definition that specifies subtasks for accomplishing the task, wherein each subtask
either specifies actions, an action being associated with required Hardware Modules and/or Software Modules that are able to accomplish the subtask;
or is split up by specifying further subtasks that are recursively split up into yet further subtasks and finally into actions;
determining concrete Hardware Modules and Software Modules of the robotic system that match the required Hardware Modules and/or Software Modules;
performing the actions with the concrete Hardware Modules and Software Modules, with mutual dependencies of the actions resulting from the recursive splitting up of the task into subtasks and actions.

This implements a planning method that can be used in different contexts:

In embodiments, the process definition is retrieved from an Inventory, by matching a process definition stored in the Inventory to the target task. This allows to perform planning with a planning system that is in constant communication with the Inventory, uses information from it and updating it.

In other embodiments, the process definition is input by a user. Planning can be performed in a standalone system, such as the CCC.

The tasks and subtasks implicitly define a graph which represents mutual dependencies of actions, in particular whether actions can be performed in parallel or have to be performed in sequence. This graph can be determined explicitly, or it can be traversed without having been determined explicitly, by splitting up the subtasks recursively and performing the resulting actions as the processing of the products takes place.

In embodiments, "determining a Hardware Module" involves choosing one of different production cells that are able to perform the target task.

In embodiments, the method comprises the steps of
while performing the actions with the concrete Hardware Modules and Software Modules, determining a current status of products, typically by sensing;
performing the steps for planning operation of the robotic system, thereby using the current status of products as the entry status.

This allows to continuously and opportunistically adapt the planning to the actual state of the products within the robotic system. The system can react flexibly to unexpected events. Depending on how long a action takes and on whether it is successful or fails—be it accomplished by a machine or a human worker—the system can adapt other actions and the allocation of resources, in particular of Hardware Modules, according to the current state.

In embodiments, the method comprises the steps of
while performing the actions with the concrete Hardware Modules and Software Modules, determining a current status of Hardware Modules;
performing the steps for planning operation of the robotic system, taking into account the current status of Hardware Modules, thereby allocating Hardware Modules to actions as production progresses, flexibly adapting the allocation to the evolving production process.

This allows to continuously and opportunistically adapt the planning to the actual internal state of the Hardware Modules within the robotic system. If a Hardware Module becomes inaccurate or if its shows symptoms that require maintenance, the planning system can e.g. distribute the workload over other Hardware Modules or other resources, such as alternative production systems, human workers, etc. in order to maintain accuracy or to delay maintenance.

The current status includes the location and pose of the Hardware Modules in space. This allows to coordinate movement of robots to avoid collisions.

The Hardware Module is a smart pluggable module of a robotic system and comprises at least one sensor for measuring an internal property of the Hardware Module, a communication unit for communicating with other Hardware Modules, a data storage unit and an embedded controller,
the embedded controller being configured to collect collected data, the collected data comprising
status data representing the current status of the Hardware Module; and
operating data representing usage of the Hardware Module;
wherein at least part of the collected data is determined from sensor data from the at least one sensor,
and to perform at least one of
storing the collected data on the data storage unit and transmitting the collected data via the communication unit.

The sensor data being transmitted can be transmitted without having been stored in the data storage unit, or it can be first stored in the data storage unit, then retrieved from storage and then transmitted.

The internal property of the Hardware Module that is measured by the sensor is, for example, a relative position of a joint of the Hardware Module, or a position of an actuator, or a temperature inside the Hardware Module, an elongation of parts of the Hardware Module (measured e.g. by strain gauges), forces and torques acting on the Hardware Module, vibrations occurring during operation of the Hardware Module, etc. Some of such internal properties can be used in the Hardware Module itself for controlling operation of the Hardware Module, such as a joint position measurement being used to control a corresponding joint actuator. Internal properties can be used to detect malfunctions, critical conditions that need maintenance, or for adjusting calibration parameters, etc. Some internal properties can be stored and/or transmitted without being used by the embedded controller for the operation of the Hardware Module itself.

In embodiments, the Hardware Module is a manipulator module comprising two mechanical links connected by a joint, an actuator for setting a position of the joint and thereby a relative position of the links.

The robotic system comprises at least two Hardware Modules, each Hardware Module being a pluggable module and comprising at least one sensor for measuring an internal property of the Hardware Module, a communication unit for communicating with other Hardware Modules, a data storage unit and an embedded controller,
 the embedded controller being configured to collect collected data, the collected data comprising
  status data representing the current status of the Hardware Module; and
  operating data representing usage of the Hardware Module;
 wherein at least part of the collected data is determined from sensor data from the at least one sensor,
 and the embedded controller being configured to perform at least one of
  storing the collected data on the data storage unit and transmitting the collected data via the communication unit;
 the robotic system further comprising a central computation and command unit configured to
  receive the collected data; and to
  control operation of the robotic system by controlling operation of at least one actuator of the at least two Hardware Modules.

In embodiments, the at least one Hardware Module is a manipulator module comprising two mechanical links connected by a joint, an actuator for setting a position of the joint and thereby a relative position of the links, A method for configuring the robotic system comprises the steps of
 inputting a list characterising available concrete Hardware Modules that are available for use in the robotic system;
 inputting a process definition for accomplishing one or more target tasks to be accomplished by the robotic system;
 automatically determining, based on their physical characteristics, a set of selected Hardware Modules and their physical configuration in the robotic system such that the resulting robotic system is able to accomplish the tasks by performing actions specified by the process definition;
 simulating actions specified by the process definition being performed by the resulting robotic system;
 and displaying results of the simulation to a user.

Here and at other occasions where displaying is mentioned, this can be accomplished by means of a display device, typically a video screen.

In the above, "available for use" can mean that the Hardware Modules are located at a particular plant, or that they are owned and under control of the end-user's organisation. The list characterising available Hardware Modules can be empty, meaning that all the Hardware Modules selected by planning will have to be procured and/or transported to the location where the system shall be implemented. In embodiments, the list characterising available Hardware Modules can specify, for each available Hardware Module, its identity. Based on this, the subsequent steps can use the individual characteristics of each Hardware Module. In embodiments, the list specifies only the type of each available Hardware Module. Based on this, the subsequent steps can use the type specific characteristics of each Hardware Module. When the system is assembled, each Hardware Module can provide its individual characteristics from its internal storage. Then these individual characteristics can be used in operation of the robotic system.

The process definition can be of the kind described earlier.

This allows to re-configure modules from a set of existing Hardware Modules, in particular a set of manipulator modules, to form a robotic assembly. Typically, this is a robot or manipulator arm with two, three, four or more degrees of freedom. The method is particularly suited for configuring smart pluggable modules as described herein.

In embodiments, the step of automatically determining, based on their physical characteristics, a set of selected Hardware Modules comprises the steps of
 retrieving historical data that is associated with the concrete Hardware Modules;
 determining the set of selected Hardware Modules according to this historical data.

This allows to refine the planning of an individual system on the basis of history information including statistical data collected over the lifetime of each individual Hardware Module that is a candidate for being incorporated in the system. The historical data, in the case of smart pluggable modules, can be retrieved from collected data that is stored in these modules themselves.

In embodiments, the step of automatically determining the set of Hardware Modules comprises the steps of
 determining whether actions specified by the process definition can be performed by the available concrete Hardware Modules from the list of available concrete Hardware Modules; and
 if this is not the case, determining additional Hardware Modules so that the combined set of additional and available Hardware Modules forms the set of selected Hardware Modules that can perform the actions specified by the process definition.

This allows the system to determine additional Hardware Modules for complementing the Hardware Modules already available, in order to accomplish the target task.

In embodiments, the step of determining additional Hardware Modules comprises the step of
 establishing communication with an Inventory, the Inventory storing Hardware Module Descriptions describing Hardware Modules,
 determining the additional Hardware Modules based on Hardware Module Descriptions stored in the Inventory.

This allows to determine the additional Hardware Modules when planning an individual system on the basis of history information including statistical data collected over the lifetime of each individual Hardware Module that is a candidate for being acquired and being incorporated in the system.

Finally, the additional Hardware Modules determined in this manner can be acquired and transported to the location of the robotic system and be physically integrated with the in-house modules.

In embodiments, the step of determining the additional Hardware Modules comprises the steps of
 retrieving, from the Inventory, historical data that is associated with a concrete Hardware Module;
 determining the set of Hardware Modules according to this historical data.

Upon connecting ("plugging") two or more manipulator modules together, thereby forming a modular manipulator system, and connecting them to a CCC, the manipulator modules are able to provide at least two types of information to the CCC unit, wherein the said two types of information comprise:
 The position and functions of the each of the manipulator modules with respect to other (adjacent) manipulator modules that it is connected to, from which the configuration of the whole modular manipulator system can be determined;

Physical characteristics of each manipulator module and the tolerances for those physical characteristics. Such physical characteristics can comprise weight, torque or force ranges, speed ranges, geometric parameters of the mechanical connection elements, and the joint position of the manipulator module or the geometric relation between mechanical interfaces, as determined by the joint position.

The central computation and command unit (CCC) controls operation of the one or more actuators of the one or more Hardware Modules by sending motion commands via communication units of the Hardware Modules. For determining the motion commands, the central computation and command unit can use feedback from sensors of the Hardware Modules or from sensor modules.

A manipulator module can be configured to receive motion commands from the CCC and to drive the actuator towards a joint position specified by the motion command A motion command can comprises a set point for a joint position, or a trajectory comprising several joint positions, each to be reached at a specific point in time, or a trajectory of speed vs. position to be followed.

The method for operating the robotic system comprises the steps for planning operation of the robotic system by
    maintaining a computational model of the robotic system;
    inputting a start configuration and a target configuration of the robotic system;
    performing model-based motion planning for determining a motion trajectory that moves the robot system from the start configuration to the target configuration, using the computational model of the robotic system;
    and the step of executing the motion trajectory with the robotic system.

The start configuration and a target configuration of the robotic system is assumed to be generated by the end-user or a higher level planning system.

The computations required for maintaining the computational model and performing the model-based motion planning can be done on the central computation and command unit, or on one or more additional data processing units, e.g. cloud based processing units.

The central computation and command unit receives information that defined the configuration of the robotic system or assembly from the manipulator modules and determines a mathematical or computational model representing the real robotic system, and its functional and mechanical properties. These properties can include system boundaries in terms of action range (space), payloads (weight), speed and acceleration.

In embodiments, the method for operating the robotic system comprises the steps for automatically determining a computational model of the robotic system by
    automatically determining a physical configuration of the robotic system by determining, for each Hardware Module of the robotic system,
        an associated Hardware Module Description comprising a description of physical characteristics of the Hardware Module;
        its geometric relation to one or more adjacent Hardware Modules;
        the identity of one or more adjacent Hardware Modules.
The Hardware Module Description can be retrieved from a database, i.e. the Inventory, that is separate from the Hardware Module, or as stored in Hardware Module itself.

The geometric relation of a Hardware Module to one or more adjacent Hardware Modules; can be determined from the spatial relation between interfaces of the Hardware Modules. Together with joint positions of each Hardware Module, the complete configuration of the kinematic link formed by the Hardware Modules is determined.

The physical characteristics can comprise at least parameters of a kinematic link formed by the Hardware Modules, such as Denavit-Hartenberg parameters. These can be sufficient for motion trajectory planning. The physical characteristics can also comprise approximate or exact 3D body models of the Hardware Modules. These can be combined to form a 3D model of the robotic system that can implement collision avoidance as part of motion trajectory planning.

Plugging a manipulator module into a modular robot system can provide at least two types of information to the central computation and command unit (CCC), such as: The position and functions of the said modules with respect to the said assembly;
    The physical characteristics of the said modules and its tolerances for those physical characteristics, wherein the said physical characteristics can comprise weight, or speed ranges, or force ranges, or length ranges of the said modules;
    History: maintenance, usage, number of cycles performed;
    Information transmitted by the module itself to the Module inventory: active/updated library.

In embodiments, the method for operating the robotic system comprises, for automatically determining the geometric relation of a Hardware Module to one or more adjacent Hardware Modules, the step of determining which of several possible relative spatial positions two adjacent Hardware Modules are in,
    from sensors embedded in at least one of the interfaces that connect the adjacent Hardware Modules; or
    from user input.

In embodiments, the method for operating the robotic system comprises the following step for automatically determining the identity of one or more adjacent Hardware Modules:
    sensors arranged to observe the Hardware Modules determining the identity of one or more Hardware Modules.

In embodiments, the method for operating the robotic system comprises one or more of the following methods for active tolerance compensation:
    measuring physical characteristics, in particular geometrical dimensions, of Hardware Modules, and storing them in association with the identity of the Hardware Module. This can be in the Hardware Module itself and/or in an external database. When planning and/or executing actions involving the Hardware Module, the stored measured characteristics are taken into account. This allows to produce with relatively larger tolerances and actively compensate for deviations from reference values.
    measuring operating conditions, in particular a temperature at a Hardware Module, and adapt one or more of the stored physical characteristics, taking into account their dependence on the operating conditions, when planning and/or executing actions. This involves modelling an effect that the operating conditions have on the physical characteristics, e.g. thermal expansion.
    when executing actions, recording corrective movements that are required to move a tool centre point (TCP) to a position where it must be, or observing its position with sensors. This gives information on a discrepancy between the TCP's expected and actual position, and from this discrepancy corrections of parameters of the manipulator can be derived.

when executing actions, taking into account elastic deformation of manipulator modules caused by the weight of the manipulator modules and the payload, if present, and moving the manipulator to compensate for this deformation.

A computer program product for performing one of the methods described above is loadable into an internal memory of a digital computer or a computer system, and comprises computer-executable instructions to cause one or more processors of the computer or computer system execute the method. In another embodiment, the computer program product comprises a computer readable medium having the computer-executable instructions recorded thereon. The computer readable medium preferably is non-transitory; that is, tangible. In still another embodiment, the computer program is embodied as a reproducible computer-readable signal, and thus can be transmitted in the form of such a signal.

Further embodiments are evident from the dependent patent claims. Features of the method claims may be combined with features of the device claims and vice versa.

BRIEF DESCRIPTION OF THE DRAWINGS

The subject matter of the invention will be explained in more detail in the following text with reference to exemplary embodiments which are illustrated in the attached drawings, which schematically show.

DETAILED DESCRIPTION

In principle, identical parts are provided with the same reference symbols in the figures.

Figure 1:
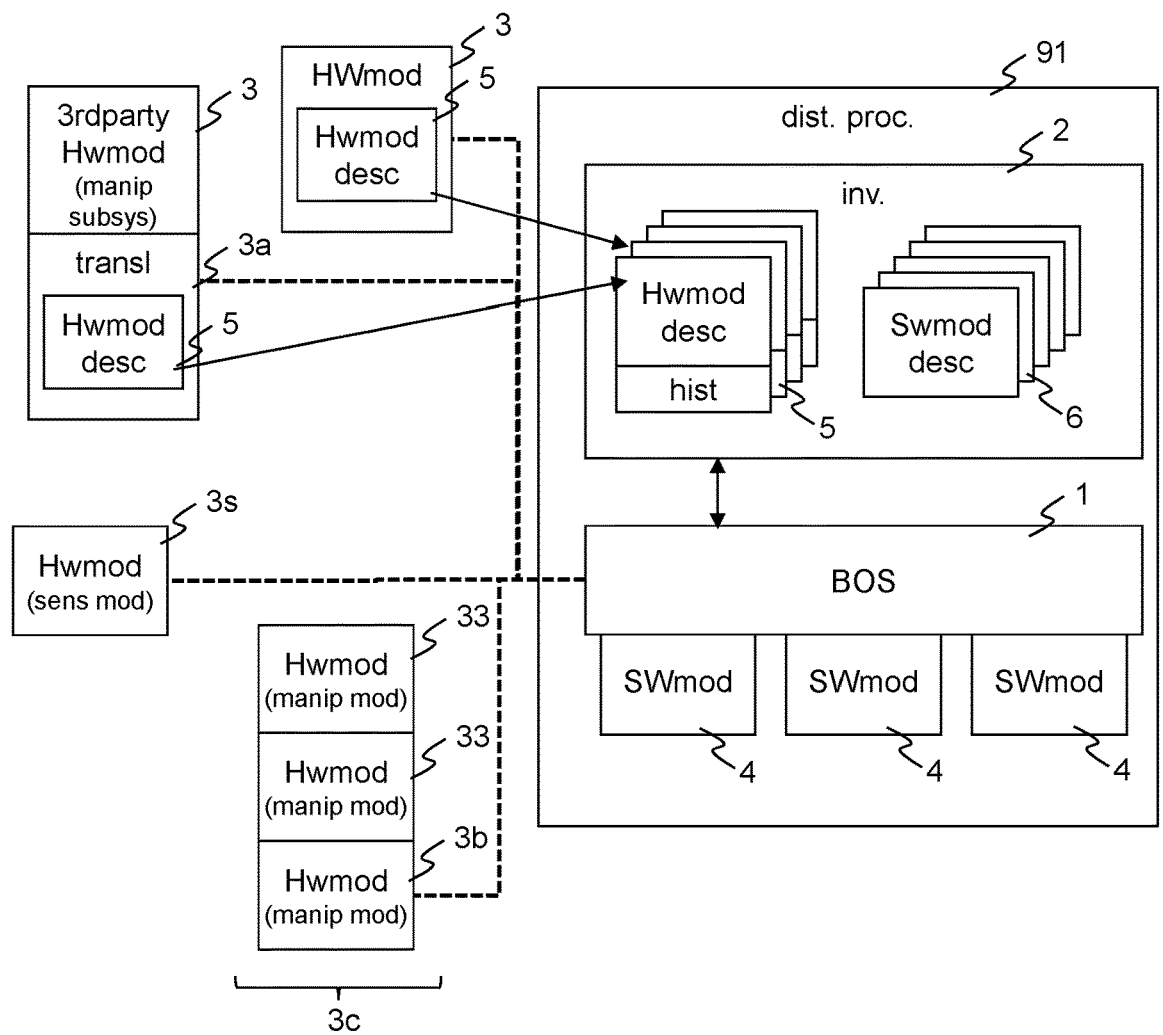
FIG. 1 elements of a robot system.

FIG. 1 schematically gives an overview of elements of a robot system, comprising Hardware Modules 3 and Software Modules 4, collectively referred to as "modules". In the real world, Hardware Modules 3 are combined and configured to work as actuators and sensors. Hardware Modules 3 can be physically connected to form manipulators such as robot arms. Or Hardware Modules 3 can be entire (non-modular) manipulators or other devices such as numerically controlled machines, and sensors returning digital (on/off) values or analogue values, including cameras with or without image processing capabilities. Such Hardware Modules 3 can be arranged to cooperate with each other in handling real world objects.

For legacy, non-modular devices, a translator 3a can be implemented, with an associated Hardware Module Description 5, which packages the functionality of the legacy device and makes it appear, to the robot system, like another Hardware Module 3.

Hardware Modules 3 can be manipulator modules 33, and a set of connected manipulator modules 33, connected to a base Hardware Module 3b, forms a robotic system or robotic assembly 3c.

Software Modules 4 reside in a distributed processing environment which implements functional entities at different levels of control and planning, such as real-time controllers for closed loop sensing and control, motion planning, collision avoidance, coordination of manipulators, production scheduling, user interfaces, calibration, communication, etc.

Depending on the level, these functional entities are executed in a distributed on data processing units that are realised—with regard to physical proximity and/or acceptable communication delays—closer to or farther away from the Hardware Modules 3. For example, closed loop control of a Hardware Module 3 is performed in a processor of a Hardware Module 3 itself or in a processor closely associated with one or more Hardware Modules 3. Coordination of and planning for production cells can be performed on a supervisory computer, and overall production optimisation and planning can be performed with cloud based processing units. Together, the data processing units form a distributed processing environment 91.

The term "Module" shall be used to refer to both Hardware and Software Modules.

The (distributed) execution of Software Modules 4 is controlled and coordinated by a Basic Operating System 1.

Each Hardware Module 3 is represented by a Hardware Module Description 5 which specifies, in machine readable form, capabilities and interfaces of the Hardware Module 3.

Each Software Module 4 is represented by a Software Module Description 6 which specifies, in machine readable form, capabilities and interfaces of the Software Module 4.

The Hardware Module Descriptions 5 and Software Module Descriptions 6 are maintained, in the distributed processing environment, in an Inventory 2.

Each of the abovementioned elements shall now be described in more detail:

Hardware Modules

A Hardware Module 3 can be, e.g., a manipulator module 33, a base Hardware Module 3b, a central computation and command unit 10, or a sensor module 3s, or a legacy device connected an controlled through a compatibiliser unit or translator 3a.

A manipulator module 33, in addition to having a computing unit as the other types of Hardware Modules 3, comprises an actuator (or motor) 39 and can comprise its own sensors 38, e.g. for forces and torques generate by or acting on the manipulator module, and can communicate sensor data to other Hardware Modules 3 by means of a communication unit 37. The computing unit of a manipulator module 33 typically is an embedded controller 35. A manipulator module can be physically connected, by means of one, two or more physical connections or interfaces 31, 32, to other manipulator modules, which together form a modular manipulator system or assembly. A physical connection or interface 31, 32, typically comprises a mechanical interface with mechanical connection elements for connecting the manipulator module to other manipulator modules, and an electrical interface with electrical connection elements for communication and power links. The manipulator module 33 is able to communicate with these other manipulator modules, to determine their identity and to exchange its identity and parameters with them and optionally with a CCC unit. By actuating the actuator 39, a geometric relation between two or more mechanical interfaces 31, 32, can be set. For brevity, such a relation can be described in terms of a joint position of the manipulator module. If the manipulator module implements a rotary joint, then the joint position is described by an angle, and the geometric relation between the mechanical interfaces can is determined by this angle and the geometric relations between the joint and each of the mechanical interfaces.

Figure 2:
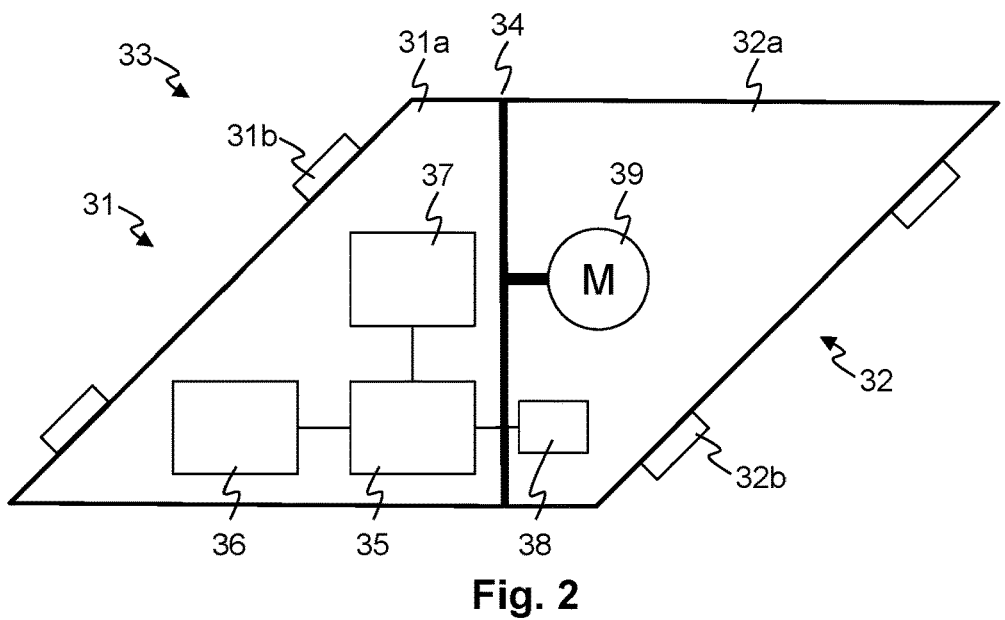
FIG. 2 a manipulator module.

FIG. 2 schematically shows a manipulator module 33 with an embedded controller 35 arranged to control an actuator 39, read sensor data from one or more sensors 38, store data to and retrieve data from a local data storage unit 36, and communicate through a communication unit 37.

Main functions tasks of the embedded controller 35 can be:
   identification of the Hardware Modules' 3 characteristics: geometry, physical data.
   determine the relative or absolute position of the module within the robot assembly by the central computation and command unit 10;
   data transfer to a central computation and command unit 10;
   receive, understand, and translate into action commands from the central computation and command unit 10;
   drive and regulate one or more actuators 39;
   add new functionalities to its own software;
   upgrade its software to keep compatibility with software of the central computation and command unit 10;
   read, collect process and store interpret data from sensors;
   collect, list, communicate and store data—for example, for establishing history data for maintenance and calibration purposes Each Hardware Module 3 knows its characteristics and is able to describe itself. Each module is characterized by at least two types of parameters amongst
   i) its position in the robot assembly,
   ii) its function (active or passive), and in the case of active function, the exact function: joint, effector, telescopic arm for handling, gluing . . .
   iii) its geometrical properties: weight, inertia, length, diameter, external dimensions, channel dimensions, —mechanical properties depends on the quality of parts and materials—
   iv) its mechanical properties/resistance: speed, force, torque, movement dimensions, reactivity . . .
   v) its tolerances regarding each parameter giving an operating window per module. Each smart pluggable module is unique and has its own control loop,
   vi) its history: number of cycles. Maintenance dates and actions, sensor related historical data . . .
   vii) its calibration data Each Hardware Module 3 can understand and implement commands from the central computation and command unit 10, and can turn it into action. An action can be a movement, but can be also wait, sleep, transfer data, etc.

Sensors 38 are driven by the embedded intelligence or embedded controller 35 of the module. Their functions can be of one of three types:
   positioning: to drive the actuator(s) based on position sensor feedback;
   system control: to support realisation of an action or give indication on the result of the action;
   maintenance/reliability:
      to give indications about the ageing of the modules itself;
      to give indications on other Hardware Modules located in the vicinity and observed by the sensor(s);

Sensor readings can be transmitted to the embedded controller 35 through wire-based or wireless channels. Examples for properties measured by sensors are temperature, humidity, accelerometer, vibration, acoustical signals, etc.

The manipulator module 33 comprises two mechanical links, a first link 31*a* and second link 32*a*, a relative position between these links being controllable through the actuator 39. The first link 31*a* comprises a first interface 31, and the second link 32*a* comprises a second interface 32. Each of the interfaces 31, 32 comprises interface elements 31*b*, 32*b* as mechanical and electrical and communication connection elements.

Figure 3:
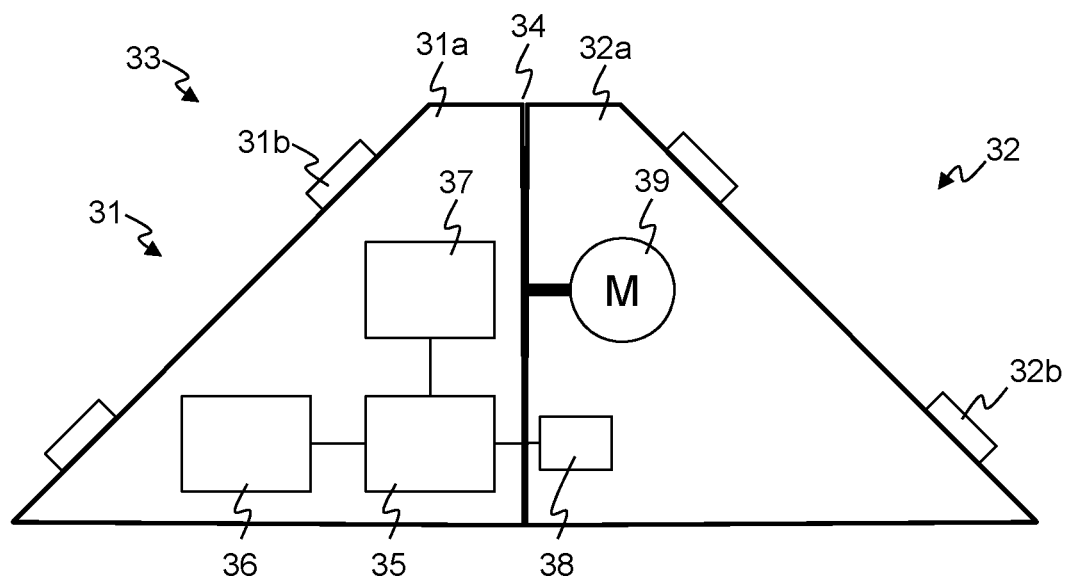
FIG. 3 a manipulator module in a different joint position.

In the present example, the joint 34 is a rotary joint, and the first interface 31 and second interface 32 lie in planes that are at an angle of essentially 45° to the axis of rotation of the rotary joint 34. This allows to rotate the two interfaces from a position in which they are parallel to one another, as shown in FIG. 2, to a position in which they are at a right angle, as shown in FIG. 3.

Figures 4A, 4B:
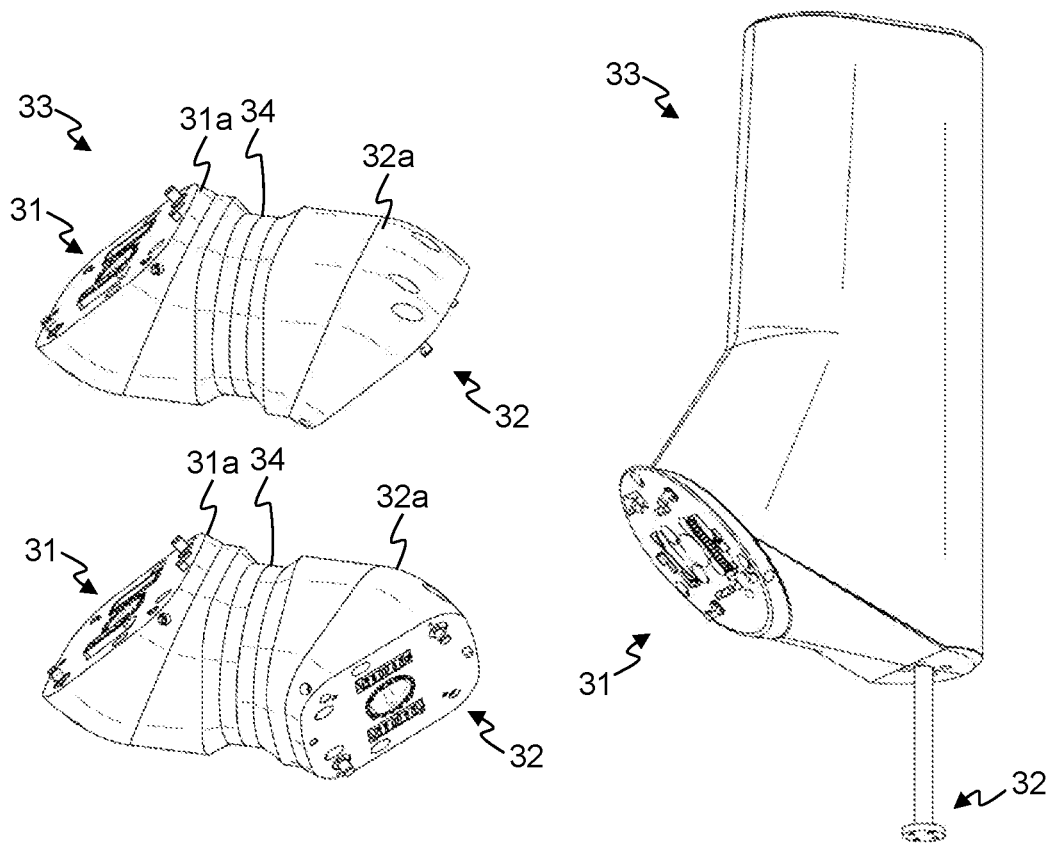
FIG. 4a shows a manipulator module with a rotary joint, at different joint positions.
FIG. 4b shows a manipulator module with a joint that allows for both translation and rotation of the second interface relative to the first interface.

FIG. 4*a* shows a manipulator module 33 with a rotary joint, at different joint positions. FIG. 4*b* shows a manipulator module 33 with a joint that allows for both translation and rotation of the second interface 32 relative to the first interface 31.

Figure 6:
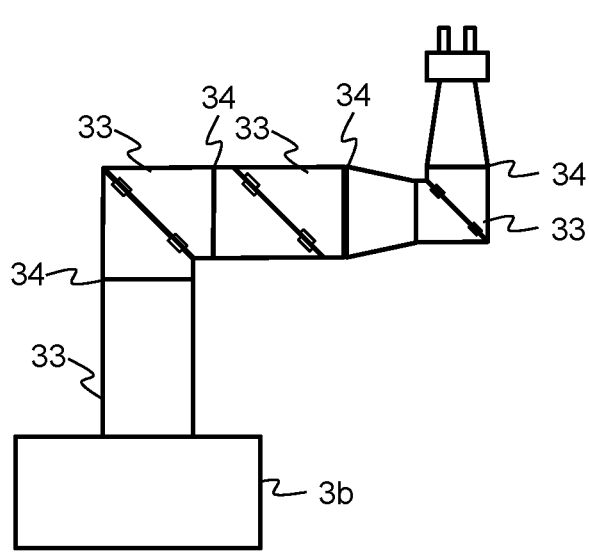
FIG. 6 a physical structure of a robot system or assembly.

FIG. 6 schematically shows a physical structure of a robot system or assembly, with manipulator modules 33 connected to form a sequential structure, starting with a base Hardware Module 3*b*. In other embodiments, not shown, more than one sequence of manipulator modules 33 can be based on the same base Hardware Module 3*b*. In further embodiments, not shown, manipulator modules 33 or Hardware Modules 3 in general have more than two interfaces, and thus tree-like structures can be assembled with them.

Figure 7:
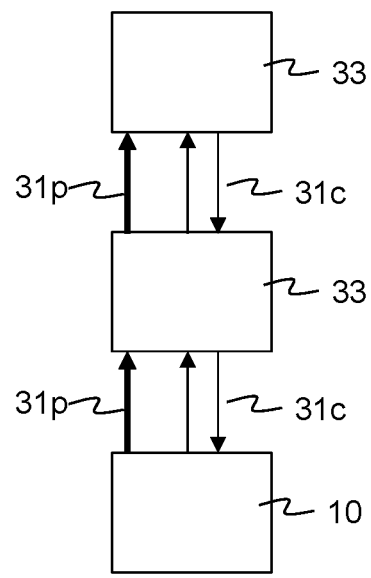
FIG. 7 an interface structure of a robot system or assembly.

FIG. 7 schematically shows an interface structure of a robot system or assembly: power supply lines 31*p* and communication lines 31*c* run, starting from a central computation and command unit 10, sequentially through the manipulator modules 33. The communication lines 31*c* can be physically separate lines for the two directions of communication, from and to the central computation and command unit 10, or both directions of communication can pass through the same physical lines, e.g. a communication bus.

A central computation and command unit 10 ("CCC") unit comprises data storage and processing elements and is capable of executing programs, for example Software Modules 4, for controlling and/or coordinating the movement of Hardware Modules 3, taking into account information, including sensor data, from other Hardware Modules 3, in particular from sensor modules. Thereby, the central computation and command unit 10 controls the Hardware Modules 3 and in particular one or more manipulator arms to perform actions based on the state of the environment. This can involve
   interfacing or interacting with other robots;
   interacting with a remote command;
   interacting with people for teaching, learning or collaboration.

Furthermore, a CCC unit can communicate with databases that are maintained by the CCC unit itself, and/or with databases maintained in computers that are external to the CCC unit, e.g. in the cloud. In such a database, the CCC, or a Hardware Module 3 itself, can store data associated with the Hardware Module 3 and its operation, and/or information gained from teaching particular tasks.

A minimal robotic system comprises a CCC and either a manipulator subsystem or one or more manipulator modules that together form a modular manipulator system.

In FIG. 1, the central computation and command unit 10 is drawn in a separate box, however its computational resources are part of the distributed processing environment 91. So the central computation and command unit 10 can implement at least part of the functionality of the BOS 1 and the inventory 2.

Programming the robotic system, using the central computation and command unit 10, can be done in one or more of the following modes:

teaching/programming mode, with a person directly typing a program in a user interface.

jog mode.

follow-me mode: the manipulator is shown an action to be accomplished by manually moving the manipulator. While the manipulator is moved, both the manipulator modules 33 and the CCC register the actions to be performed. The CCC compiles and coordinates the action of the modules.

coordinate mode: the user defines coordinates of the location that the manipulator needs to reach. The CCC calculates the best/optimized paths to achieve the desired location and transmit corresponding motion commands or trajectories to each modules.

program coding.

Operating the robotic system, using the central computation and command unit 10, can involve one or more of the following functions:

Performing a programmed action/executing a program.

Controlling the manipulator modules 33 based on sensor data.

Supervisory control: prevent collisions (using sensors) and maintain safety of operation.

Storing process data: enabling quality control, and smart (re-) planning of activities.

Action requests can come either from directly from and end-user through the user interface, or from other robots, machines, or entities through an operating system of a higher level entity, such as a group of collaborating robots, a manufacturing cell, factory, etc.

Implementing an action can be done by iteratively planning and simulating the action on the basis of the mathematical model in order to determine the sequence of steps or movements to be implemented by each of the modules.

Then the orders for these steps or movements are transmitted to the modules' controllers. Each controller reads only the actions directed to him and does not take into account the actions relevant to other modules. Each manipulator module 33 executes the requested actions in the sequence given by the CCC, can adapt them to sensor feedback from its own sensor 38 or from other Hardware Modules 3, and gives feedback to the CCC.

Software Modules

The software modules can be integrated by a «basic operating system» 1 (BOS) which implements an interface between Hardware Modules 3, other Software Modules 4, and data storage means, such as libraries comprising software, libraries comprising hardware. The basic operating system BOS 1 comprises fundamental functions which enables at least to operate a standalone robot implementing a set of basic operations. The BOS 1 works as an interface between the Software Modules 4, some of which communicate with and control Hardware Modules 3, thereby enabling control of a robotic system built from the Hardware Modules 3.

A Software Module 4 can exist independently of a Hardware Module 3, for example, when it accomplishes data processing without the need for specific hardware.

A Software Module 4 can exist in association with a Hardware Module 3, for example when execution of a function provided by the Software Module 4 involves the use of a specific Hardware Module 3.

Figure 5:
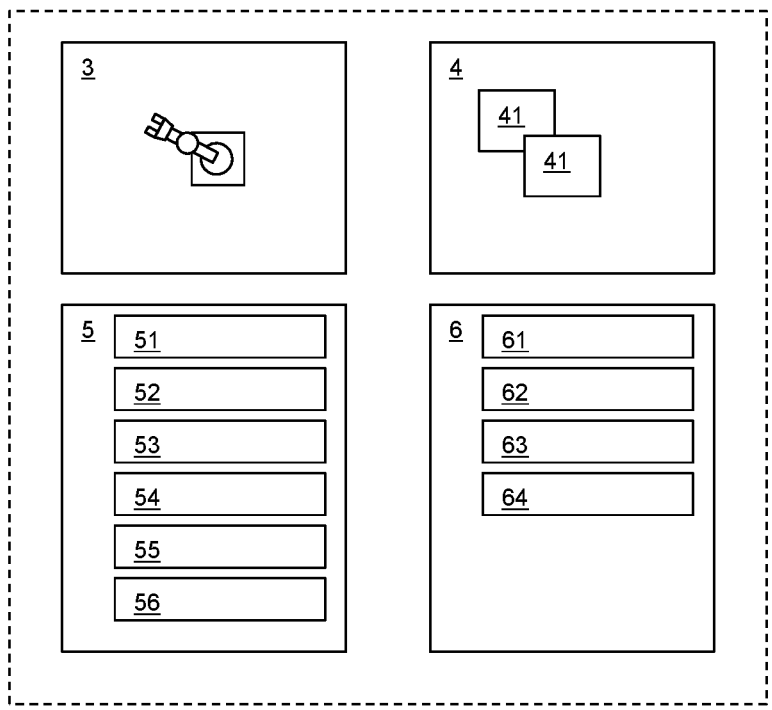
FIG. 5 Hardware and Software Modules and their description.

FIG. 5 schematically shows Hardware Modules 3, Software Modules 4 with associated Hardware Module Descriptions 5 and Software Module Descriptions 6.

Each Hardware Module 3 is represented by a Hardware Module Description 5 which specifies, in machine readable form, capabilities and interfaces of the Hardware Module 3.

The Hardware Module Description 5 can comprise hardware ID 51: a unique identifier of the Hardware Module 3;

hardware parameters 52: parameters describing properties of the Hardware Module 3 that to not change, for example, a nominal length and weight of a robot arm, the size of a fixture. The hardware parameters 52 can include a 3D geometric model, allowing to plan for collision avoidance when planning robot movement;

hardware location 53: the position and orientation of the Hardware Module 3, typically within a universal production cell;

hardware state 54: parameters describing an internal state of the Hardware Module 3, for example, a current position of an actuator;

calibration data 55: typically properties of the Hardware that change slowly and are measured from time to time, such as deviations from nominal hardware parameters 52;

history 56: for example, number of operations performed, parameters of these operations, number of successful and unsuccessful operations, related error messages, etc.

Each Software Module 4 is represented by a Software Module Description 6 which specifies, in machine readable form, capabilities and interfaces of the Software Module 4.

The Software Module Description 6 can comprise module ID 61: a unique identifier of the Software Module 4;

module method 62: one or more methods implemented by the Software Module 4;

module state 63: an internal state of the Software Module 4;

module resource 64: resources required by the Software Module 4. This can be Hardware Modules 3 that the Software Modules 4 is configured to control. This can also be computing resources that the Software Module 4 requires to run itself.

The Hardware Module Descriptions 5 and Software Module Descriptions 6 are maintained, in the distributed processing environment, in an Inventory 2.

Operation of the BOS

When a Hardware Module 3 is connected to a system, and in particular when a manipulator module 33 is connected to a robotic system, its presence is detected, e.g. by a central computation and command unit 10 to which it is connected directly or through other Hardware Modules 3.

The BOS receives information that the Hardware Modules 3 provide about themselves, such as physical characteristics of manipulator modules, and their position and function within a modular manipulator system. From this information, the BOS creates the virtual infrastructure, that is, a virtual representation of the modular manipulator system and its functional and mechanical possibilities, and further infrastructure such as other manipulators, hardware, production line, . . . as represented by associated Hardware Modules 3. The BOS can simulate within the virtual representation actions that are required from the CCC, and then implement, via the CCC a required action if it is possible; indicate that a required action is not possible.

This virtual representation can also be used in a configuration tool for sales support.

In more detail, to implement a required action or command, the execution system:
 generates first a simulation within the virtual infrastructure to:
  Identify the abilities of the real infrastructure: Reference
  Prevent collisions. This can be done based on geometric information of active and passive modules and further infrastructure, and/or using camera images and further sensors, and can involve dynamic path planning for all the active modules.
  Optimise according to predefined criteria This can be done by iteratively or in parallel simulating and evaluating a plurality of different implementations of the command or action.
  Make workload reparation. This can be done by identifying time critical processes, tasks or subtasks and distributing the workload better or propose additional hardware and/or software modules.
  Check the advantages/disadvantages of new Apps
 transmits commands to the execution part, which distributes the commands to each part of the real infrastructure.

Module Inventory

The Inventory 2 serves as a library registering information in relationship with Hardware Modules 3 and Software Modules 4, and in particular Hardware Module Descriptions 5 and Software Module Descriptions 6. The Inventory 2 exchanges information with the Basic Operating System 1. In this way, the Basic Operating System 1 can retrieve information about the physical characteristics, current state and historical data regarding a module, and also regarding compatibility between Hardware Modules 3 and Software Modules 4. Storing a module's history in the Inventory 2 allows to give information about the module's status and history. The status can, if a module is not in operation, include the module' location in a hardware warehouse.

Information regarding a module can be generated by the module itself and transmitted to the Inventory 2 directly and/or via the BOS. For this, a standardised structure of the information and a protocol for transmitting the information is used. For third party devices that are not made up of known Hardware Modules 3 and do not provide for such a standardised interface, an interface unit or compatibiliser unit is added, configured to provide on one side an identity of the device and the standardised information and communication means, and on the other side means for retrieving information from the third party device.

In an embodiment, the Inventory 2 is monitored in order to detect updates to Software Modules 4 (and also Hardware Modules 3). If an update is detected, or if a function is detected that promises to perform a particular operation in a better way (perhaps with drawbacks in another area), this information can be transmitted to Hardware Modules 3 or entire installations that can make use of this operation. Similarity of operations can be determined on the basis of their descriptions. Heuristic learning methods, e.g. using neural networks.

Planning a Task

This section gives an example for planning the execution of a task in a concrete manufacturing system, which can be a robotic system or a production cell. The example can be adapted to the planning of a task in a generic production cell, in which the hardware equipment is simulated. The example can also be adapted to re-planning, where the planning starts at some intermediate state of the production cell—be it concrete or simulated—in which some production steps have already taken place, instead of an initial state in which no production steps have taken place yet.

A pre-requisite is that the production cell has been designed and is defined in terms of:
 concrete Hardware equipment, i.e. Hardware Modules present
 concrete software modules
 the spatial location of the Hardware equipment
 one or more tasks to be implemented
 etc. . . .

The BOS is connected to the inventory as well as to the concrete Hardware. Specific software modules which have been selected during the design phase have been installed either on the Hardware equipment or on the BOS. The BOS is aware of the available HW equipment, of their status in real time, and of the available software modules.

The inventory gives the BOS access to Hardware Module Descriptions 5, such as Hardware specifications, historical data related to the Hardware, to process definitions and to software at a general level. This can comprise information as in the following table:

|  | Hardware | Software | Process definitions |
| --- | --- | --- | --- |
| Specifications | From suppliers | From creator/ supplier | subtasks and actions |
| Tolerances | From suppliers/ from experience | | |
| Historical data | From HW of the same type connected to the inventory | Which version, version date | implementations of the process, hardware and software modules used |
| Maintenance log | Dates/ maintenance actions | | |
| Resources | Power requirements | Memory and processor requirements . . . | other systems, human workers |

-continued

|  | Hardware | Software | Process definitions |
|---|---|---|---|
| safety | What are the requirements for the installation? During use? | | |
| Calibration | | | |
| Links | software modules, processes | hardware modules, processes | hardware modules, software modules |

The inventory does not have the information for each specific, concrete task definition for example, but rather for types of tasks on an abstract level. A company can thereby provide abstract task know-how without disclosing special process know-how. This allows protecting confidential process data from a third party.

Planning of a task starts with defining an Entry Status E and an Output Status O of the task. Typically, these describe the status or state of a product that is to be manufactured. Alternatively or in addition, they can also describe the status or state of the manufacturing system.

Then, the task can either be mapped to a set of actions, or it is split into subtasks, which in turn is mapped to actions or recursively split into further subtasks. This can be done either by a human or by the BOS. Subtasks are also defined by entry and output statuses.

Choice of Production Cell (in Case of Multiple Production Cells) and Splitting of the Task into Subtasks To do so, the BOS 1 maintains a computer representation of the available production cells as well as the equipment, that is, the Hardware Modules 3, available within the cells. It queries the inventory to compare the task to be implemented with the task definition stored. It can then find out some similar tasks and their process definition, and a list of required equipment or Hardware Modules 3 for accomplishing the task. Similar tasks can be tasks that have the same structure but under different conditions and environments. For example, picking and placing an object or drilling a hole. Picking and placing a computer screen is similar to but not the same as picking and placing a steel ball. The BOS can then compare this list with the concrete equipment that is available within the production cells. It can then identify the production cell which best matches the list of "must have" required equipment. If necessary, it can generate a list of Hardware Modules 3 that are required but are not available.

The task is then split in subtasks by the BOS. Those subtasks can be realised with the available equipment within the production cell and enabling to achieve the Output O of the task. If necessary, the BOS 1 can generate suggestions for additional non-available equipment.

Each subtask is defined by an entry status and an output status. These status described the state of the part to be processed in terms of visible or measurable characteristics, for example:
shape of a part
weight
color
pose (position and orientation) of the part in 3D space
a feature of the part has been measured
etc. . . .

Entry status and output status usually are different. Typically, only a subset of such characteristics and their change can be specified for each task. The other characteristics are unaffected by the task, or are not of interest.

Sensors for contact or noncontact measurements, in particular a vision system, are able to detect or measure the change of status between entry and output. The sensors are connected to the BOS and able to transfer the data to the BOS. The BOS can perform a comparison between the measured status and a status according to the process definition to know at which stage of the process the part is. This can be done to check the status, to see whether the execution of the process definition is going according to plan. It can also be done to re-plan execution if a part enters the production cell unexpectedly, i.e. not under control of the BOS 1, or after a failure of an action.

The following tables give examples of process definitions. Therein, entry and output status such as x, y, z express that one or more characteristics have certain values. More concrete examples for this are given in the subsequent section on planning.

Example of a process definition:

| TASK A | Entry E | Output O | Associated HW |
|---|---|---|---|
| Subtask A1 | E | x | |
| Subtask A2 | x | y | |
| Subtask A3 | y | z | |
| Subtask A4 | z | O | |

Since the entry status of A4 is the output status of A3, it follows that A3 must be executed before A4. One or more of the subtasks could be actions, i.e. not subject to being split up into further subtasks.

In the following example, the process definition comprises subtasks B1 and B2 which can be performed independently:

| TASK B | Entry E | Output O | Associated HW |
|---|---|---|---|
| Subtask B1 | E | x | |
| Subtask B2 | y | z | |
| Subtask B3 | x + z | w | |
| Subtask B4 | w | O | |

The entry status of B3 requires that B1 and B2 be performed. But the entry status of B1 and B2 are unrelated, so B1 and B2 can be performed in any order or simultaneously.

In the following example, the Process definition comprises subtasks C1 and C2 that could be swapped:

| TASK C | Entry E | Output O | Associated HW |
|---|---|---|---|
| Subtask C1 | E OR y1 | x1 OR x2 | |
| Subtask C2 | E OR x1 | y1 OR y2 | |
| Subtask C3 | y2 OR x2 | O | |

The table entries signify, for example, that Subtask C1 can change the status from E to x1, or it can change the status from y1 to x2 (but not from E to x2 or from y1 to x1). Consequently, in order to get from entry status E to output status O, there are two paths:

1. perform C1 to get from status E to x1, perform C2 to get from x1 to y2, perform C3 to get from y2 to status O.

Planning

While performing actions for accomplishing one or more tasks, the BOS knows the occupation of each Hardware Module 3, or generally of resources within the production cell in real time. It also knows the status of the parts being processed. This can be accomplished thanks to continuous or frequent observation of the production cell and the parts by the sensors. It allows to adapt the planning, or to re-plan, depending on the outcome of actions being performed. When doing this, it is not necessary to plan all future actions specified by a task definition and its recursive reduction to subtasks and finally actions. Another way to implement the planning process is to determine the mutual dependencies of subtasks and finally actions, and to opportunistically perform whatever actions can be performed according to the task definition and for which resources and in particular Hardware Modules 3 for performing the actions are available.

This can be done in the following manner: Once the BOS finds that
- the entry status of a subtask is satisfied
- resources or equipment, which can be a Hardware Module 3 or a group of Hardware Modules 3, required for performing that subtask are available then it can give the order to the equipment to process the part.

For example, for task C outlined above in general terms, exemplary concrete status are:

| TASK C | Entry E | Output O | Associated HW |
|---|---|---|---|
| Subtask C1 Painting | E = White tube, Weight = 50 +/− 2 g Or y1 = White tube, weight = 90 +/− 2 g | x1 = Green tube, weight = 50 +/− 2 g Or x2 = Green tube, weight = 90 +/− 2 g | Painting robot |
| Subtask C2 filling | E = White tube, Weight = 50 +/− 2 g OR x1 = Green tube, weight = 50 +/− 2 g | y1 = White tube, weight = 90 +/− 2 g OR y2 = Green tube, weight = 90 +/− 2 g | Filling machine |
| Subtask C3 | y2 OR x2 | O | |

The production cell detects the status thanks to a camera equipped with an app for color detection and a balance for weighing. The camera and balance are examples for Hardware Modules 3 that are sensor modules.

When implementing the actions for performing the task, there is no sequence or action planned in a timeframe. The planning is done live once the BOS has received and processed the status information from each Hardware Module 3 and Software Module 4 of the production cell. The sequence and/or parallel execution of actions is defined an implemented implicitly by the entry and output status for each subtasks.

Planning with Cooperating Robots

In some task definitions, requirements can specify the need for two robots, or of a human and a robot. The BOS will then select the adequate Hardware Modules 3 available to perform the task in collaboration with other Hardware Modules 3 or a person.

The BOS determines the actions to be accomplished by each Hardware Module 3, and their mutual dependency, e.g. as a sequence and/or by parallel execution. The vision system can transfer to the BOS information related to the execution of the tasks by the robots in real time, so that the BOS can cause the next order to be executed once the previous one is finished.

Example of task definition: Drilling a hole of diameter 1.2 mm into a piece of metal. Robot R1 is equipped with a gripper and robot R2 is equipped with a drilling tool. The BOS will request status from robot R2. Robot R2 is not yet equipped with the right type of drill bit for drilling a hole of 1.2 mm into a piece of metal. The BOS identifies the right drill bit required thanks to information from the inventory. The BOS knows from the inventory that the production cell already has the right type of drill bit stored in its buffer or storage area. The exact location of the drill bit within the storage area is determined thanks to a camera assisted with vision system software. Robot R1 receives the order from the BOS to replace the drill bit of robot R2 with the one required for the action. This task is divided into subtasks:

1. remove the current drill bit from the Robot R2
2. bring the current drill bit to the buffer area
3. pick up the right drill bit in the buffer area
4. bring and mount it to robot R2

Alternatively, the BOS can alert a human worker and instruct him to change the bit.

During implementation and afterwards, for verifying the result, the vision system will give information about position and orientation of objects to the BOS. Once the robots are ready, the BOS will order to Robot R1 to pick and place the piece of metal at a predetermined place in a specified orientation, and to hold it. Then, once this subtask is completed, i.e. the objects are located at the right position, the BOS validates that all "must" conditions that make the "drilling" action possible are met, the BOS will order to Robot R2 to drill the part at a predetermined position.

In the case of cooperation with human workers, robots can be compliant robots that satisfy requirements for human-machine collaboration, e.g. as in Specification ISO/TS15066 «Robots and robotic devices—Collaborative robots».

Design

The following section gives an example for the design of a production cell according to a specific target task. This design methodology does not have the goal to generate the perfect production cell for performing this task, but rather one that allows to start the production of a part.

As already stated, the BOS is connected to the Inventory 2. The Inventory 2 comprises specifications from suppliers, general historical data and (abstract) process definitions. In order to design a system for performing a given target task—which can comprise several separate tasks considered as subtasks—the task is part of performance requirements, and Hardware Modules 3 and their configuration are determined such that the robotic system satisfies the performance requirements. An example for this process is given in the following, first in general and then for a concrete case.

A task definition can define what needs to be performed, how many times, with which quality grade, which accuracy. What needs to be performed can be defined in terms of outcomes and/or in terms of actions. A task definition can be specified by one of various known programming paradigms or by a combination thereof: GUI manipulation of a computer model, teaching mode with a concrete manipulator, parameterised motion commands, learning by demonstration, etc. . . . based on data entered by a human operator, from CAD files, from a vision system, from force and other sensors, etc.

The BOS, with an appropriate software, transcribes these observations of movement, trajectories, orientation, etc into actions to be executed by one or more Hardware Modules 3. The human operators can add required tolerances, the number of parts, their weight and all specific requirements in terms of performance criteria.

Given a target task, the BOS is able to find within the inventory 2 comparable tasks and to divide them into subtasks. For this, the target task definition is compared by the BOS with a list of abstract process definitions stored within the inventory. The following algorithm can then be implemented:

1. Retrieve a comparable or matching process definition of the task
2. Split the task into subtasks according to the process definition OR Match the process definition with existing production cell descriptions (from the Inventory 2), that is, with existing production cells that can accomplish the target task. Then the design can be considered completed, unless alternative designs are desired, e.g. for finding an optimal design.
3. For each subtask, retrieve in the inventory a list of types of required Hardware to perform it, a list of associated software, a list of independent relevant software, and a list of combinations of Hardware Modules 3 and Software Modules 4.
4. Compare the list to the specific requirements of the target task, such as the performance criteria, determine lists of possible hardware and software.
5. Refine the selection of Hardware, associated software, related software and possible combinations.
6. Perform a final selection of the Production Cell: The list is compared to the existing assets of the production cell or of the factory, that is, to assets that are "in-house". When existing assets match the requirements, and there is no conflict between their next planned maintenance and the size of the batch to be produced, they are selected with priority. For the required assets which are not already "in-house", the BOS can propose, thanks to the inventory 2, a list of equipment and in particular Hardware Modules 3, according to predefined or user-defined criteria such as: price, energy consumption, overall price including maintenance costs, rent of equipment, etc . . . (where the criteria can have different weights). The BOS may need to search within the inventory, at a first level, for types of equipment that are required. On a second level, it can search for types of components that can be assembled to build one piece of equipment. This can be, in the case of there being pluggable modules that can be assembled, or in the case of effectors and robots being combined, or in the case of machines requiring supplies of specific consumables.
7. Output a mapping or physical configuration of the Production Cell, and optionally also of orders for required Hardware Modules 3 and Software Modules 4.
8. Once the new Production Cell is established, update the Inventory 2 to reflect the new status of the Hardware Modules 3 that are involved, and transmit and collect operating data from the Hardware Modules 3 and Software Modules 4 to the Inventory 2.

If two or more process definitions matching the requirements exist within the Inventory 2, the BOS can simulate both scenarios and select the optimal scenario according to predefined or user-defined criteria.

Such predefined or user-defined criteria could be: lowest investment, fastest production cell set-up, re-use as much as possible existing assets of a production cell or factory.

The BOS can order assets that already are in-house to be transported to the location of the production cell. Either a remote-controlled trolley can pick them up, or a human worker, or, if it is mobile, equipment can transport itself.

The Inventory 2 can comprise information at two levels:
describing Types of hardware from different brands with specifications and tolerances given by suppliers.
describing Individual concrete Hardware Modules 3 from the inventory of a company, or of a customer, or of a production site. this can include historical data of each Hardware Module 3, associated with an ID of the Hardware Module 3.

The BOS can comprise information
describing the configuration of a Production cell.

Once a design is implemented, e.g. as a production cell, production can start and grow. It may initially not run perfectly, requiring adjustments or re-design. The process is iterative: Once the design is set-up, it is not necessarily fixed: The BOS can still access the Inventory 2 and search for a new optimum using different or newly available Hardware Modules 3 and/or Software Modules 4.

With regard to step 1 shown above, the following describes process definitions, and their relation to product design:

Two levels of process definitions can co-exist:
process Macro-definition: for example, "assembly of two parts"
process Micro-definition: for example, "assembly of two parts by screwing".

Given a process Macro-definition and knowledge of the Task Output characteristics or status, and performance criteria, the BOS can access to the Inventory, meaning that the BOS:
has a collection of process Micro-definitions related to the process Macro-definition,
can select process Micro-definitions allowing to achieve the task Output,
generate a list of several process micro-definitions matching the task output.

In the example of "assembly of two parts", the system could deliver the following information:

| Macro definition | Assembly of two parts | | | | |
|---|---|---|---|---|---|
| Micro definition | By screwing | By gluing | By welding | By pinning | By embedding |
| Matching between Inventory + criteria + output characteristics | ok | ok | NO | NO | ok |
| | Data extracted from Inventory and computed by the BOS: | | | | |
| Occurence | 50% | 20% | | | 15% |
| Average Time duration for execution | 1 min 43 s | 1 min 45 s | | | 1 min 52 s |
| Time for setting up installation | 3 days | 2.75 days | | | 2.80 days |

| Macro definition | Assembly of two parts | | |
|---|---|---|---|
| Price of investment | 75 kCHF | 70 kCHF | 75 kCHF |
| Price per unit produced | | | |
| . | | | |
| . | | | |
| . | | | |

By analysing and comparing the performance criteria, the system is able to give a list of process Micro-definitions:
Assembly of two parts by screwing
Assembly of two parts by welding
Assembly of two parts by gluing It can propose, based on the historical data from the Inventory, and some calculations, the simplest or the one that could be implemented the soonest as possible.

The selection of the process Micro definition can be given to a human operator, or the system can select the most appropriate process Micro-definition by combining and weighing the user-defined criteria: the time for setting up the installation and the cost per unit can have a weight 2, and other criteria have a weight of 1. The system can output a set of different process definitions from which the user can choose.

Example 1

Design a production cell whose task is: Assembly of two parts by screwing. The plant or a production cell already exists and comprises some assets, such as a manipulator, cameras, process table (working area, optionally with fixtures), etc.

1. Process Definition

In this example, the process definition is determined by:
Teaching mode: a person shows through the vision system the tasks which need to be performed.
This is augmented by CAD files that give the exact measurements, and the relative orientation of the parts in the assembled state.
Human operators also input to the system some performance criteria like the number of repetition, weight of parts, material of parts, . . .
An ERP system can provide further information on parts, orders, batch sizes, etc.
Parameters are collected thanks to different means like for example:
Weight of parts (information given by human operators).
Environment (information given by teaching mode/vision mode or human operators): clean/white room.
Distance to be covered (information given by teaching mode/vision mode): maximum 1.5 m.
Shape of parts (information given by CAD).
Torques on manipulator joints when manipulating the parts (calculated from weight and speed of implementation (information given by teaching mode).
. . .
A reference point can be used to make the calculations for the set-up. This reference point refers to the location of the process table no 1 in our example. The locations within the production cell are defined relative to this reference point. If no reference point is given by a human operator, the system automatically chooses process table no 1, and the reference point is placed in the center of the production cell.
Process Definition

| General description | Input from: | Assembly of two parts by screwing |
|---|---|---|
| Number of cycles | Operators and/or ERP | 100'000 |
| Deadline for completion (optional) | Operators and/or ERP | 30 Jun. 2017 - 3 months from design start |
| Minimal cadence | Operators and/or calculation and/or ERP | |
| Environment | Operators and/or vision mode | Clean |
| Reference points for setting-up the installation. | Operators | Process table 1, Center of the production cell |
| Human collaboration | Operators | allowed |
| Maximum number of preventive maintenance events allowed | Operators | 5 |
| Number of proposals to be studied | Operators | 5 |
| Maximum available space | Operators | 20 m$^2$ |

Some parameters can be pre-programmed

The number of preventive maintenance events should be as low as possible. Above 5 preventive maintenance events, a Hardware Module 3, alone or in combination with a Software Module 4, is not considered for the production cell.

Costs of hardware and hardware with software: the BOS determines a final cost per unit produced, including amortization costs.

When searching for designs, the BOS can initially be constrained to look at a limited set of characteristics of the design that allow to achieve the desired performance and to match the performance criteria, or begin with standardised solutions and move to specialized solutions.

The BOS can perform the search, for example, until it has the desired number of proposals (for example 5) or until a total cost is optimized.

The BOS can search to minimize the space required for performing the task inside a production cell, or for a production cell as a whole.

When a subtask is performed at a rate above 20% by human workers, options with only human workers must be explored.

The inventory is provided with standards and regulations, for example, for human collaborative work, so that the limitations are taken into account in the calculations by the BOS. Such regulations can specify, for example, the maximum load to be carried by a human worker, the need for protective devices when certain operations take place, safety features for robot manipulators, etc.

Parts: The following table shows properties or characteristics of parts as represented in the Inventory 2:

|  | Collected through: | Part A | Part B | Part C |
|---|---|---|---|---|
| Weight (g) | Operators OR measured | 880 g | 250 g | 5 g |
| Tolerances on weight (%) | Operators OR CAD | 5% | 5% | 5% |
| Shape | CAD | Shape number 85 in the Inventory | Shape number 22 in the Inventory | Shape number 43 |
| Size/dimensions L*l*h (mm) | CAD and/or vision system | 180 *320*45 | 18*22*5 | Diameter: 8 Height: 32 |
| Tolerances on size (%) | Operators and/or CAD | 2% | 2% | 2% |
| Material |  | Stainless steel 316L | Stainless Steel 316L | Stainless steel 304L |

For determining a matching process definition, at this stage, only movement and actions can be taken into account to set-up the initial list of possible hardware and software. The BOS searches the Inventory for a corresponding Process definition, for example: "screw two parts when parts are threaded".

The process definition may be refined as follows, based on information from the Inventory:

|  | By screwing Method A | By screwing Method B | By screwing Method C | ... |
|---|---|---|---|---|
| | Screw two parts when parts are threaded | | | |
| Matching between Inventory + criteria + output characteristics | Ok | ok | NO | NO |
| | Data extracted from Inventory and computed by the BOS: | | | |
| Occurrence | 50% | 20% | 15% | |
| Average Time duration for a single task | 1 min 43 s | 1 min 45 s | 1 min 52 s | |
| Time for setting up installation | 3 days | 2.75 days | 2.80 days | |
| Price of investment | 75 kCHF | 70 kCHF | 75 kCHF | |
| Price per unit | | | | |
| ... | | | | |

As the time to start production is set-up, by default, as a parameter that should be minimised, the BOS can choose, within the scope of screwing, method B.

2. Divide Tasks into Subtasks

Match with Existing Production Cell

As a first option, the BOS can first compare the process definition which the existing production cells described in the Inventory and implementing the same task. If there is such a match, the BOS is able to:

Deduce the subtasks

Choose the production cell giving the best performance in terms of price per unit efficiency, lowest downtime, time to start production for the targeted production.

Amongst the most efficient production cell, establish a first list of the required hardware and software types, and possible combinations.

As a second option, if there is no match, the task is then split into subtasks by the BOS according to the process definition found in the Inventory 2.

| Subtasks | Entry E | Output O | Which info required? |
|---|---|---|---|
| Subtask 1 | Pick parts A, in the buffer areas | Part A is placed on the process table PT1 | Description of A Number of cycle Accuracy Sensitivity |
| Subtask 2 | Pick parts B, in the buffer areas | Part B is placed on the process table PT1 | |
| Subtask 3 | Pick parts C, in the buffer areas | Part C is placed on the process table PT1 | |
| Subtask 4 | On PT1, Position and hold part A | Part A is ready to receive part B on top | |
| Subtask 5 | On PT1, Place part B on top of part A | Part A and B are ready to be screwed together | |
| Subtask 6 | On PT1, Insert part C in the threading of assembly A + B | | |
| Subtask 7 | On PT1, Screw in part C and tighten screw | Assembly of A + B + C | |
| Subtask 8 | Pick and Bring assembly A + B + C to process table PT2 | Assembly on PT2 | |
| Subtask 9 | QC of assembly | | |

Subtasks 1, 2 and 3 can be performed independently, or simultaneously.

Subtask 4 can be done directly after subtask 1 or after subtask 2 or after subtask 3.

Subtask 5 needs to be performed after subtask 4 but can be performed before subtask 3.

The actual order of the tasks when implementing the actions of the process definition is determined during planning, typically in an opportunistic manner 3. Determine Types of Hardware Modules 3 and Software Modules 4

If usable existing production cells are found in the Inventory, this step may be skipped.

For each subtask, a list of associated types of Hardware Modules 3 and Software Modules 4 is retrieved from the Inventory 2:

| Subtasks | Entry E | Output O | Associated HW | Associated SW | Independent SW | Associated combinations |
|---|---|---|---|---|---|---|
| Subtask 1 | Pick parts A, in the buffer area 1 | Place part A on the process table PT1 | Manipulator Gripper Process Table Buffer area Vision System | SW 1 SW 2 SW 3 | SW 101 | Manipulator + SW1 and/OR SW3 Gripper + SW2 |
| Subtask 2 | Pick parts B, in the buffer area 2 | Place part B on the process table PT1 | Manipulator Gripper Process Table Buffer area Vision System | SW 1 SW 2 SW 3 | SW 101 | Manipulator + SW1 and/OR SW3 Gripper + SW2 |
| Subtask 3 | Pick parts C, in the buffer area 3 | Place part C on the process table PT1 | Manipulator Gripper Process table Buffer area Vision System | SW 1 SW 2 SW 3 | SW 101 | Manipulator + SW1 and/OR SW3 Gripper + SW2 |
| Subtask 4 | On PT1, Position and hold part A | Part A ready to receive part B on top | Manipulator Gripper Camera Process table Vision System | SW 1 SW 4 SW 2 | SW 104 | Manipulator + SW1 Gripper + SW2 Camera + SW4 |
| Subtask 5 | On PT1, Place part B on top of part A | Part A and B are ready to be screwed together | Manipulator Gripper Camera Process table Vision System | SW 1 SW 4 SW 2 | SW 104 | Manipulator + SW1 Gripper + SW2 Camera + SW4 |

-continued

| Subtasks | Entry E | Output O | Associated HW | Associated SW | Independent SW | Associated combinations |
|---|---|---|---|---|---|---|
| Subtask 6 | On PT1, Insert part C in the threading of assembly A + B | | Manipulator Gripper** Process table Vision System | SW 1 SW 5 | SW 105 | Manipulator + SW1 Gripper + SW5 |
| Subtask 7 | On PT1, Screw in part C and tighten screw | Assembly of A + B + C | Manipulator Effector = screwdriver Torque sensor** Process table Vision System | SW 1 SW 6 | SW 101 | Manipulator + SW1 Screwdriver + SW6 |
| Subtask 8 | Pick and Bring assembly A + B + C to process table PT2 | Assembly on PT2 | Manipulator Gripper Conveyor Process table Vision System | SW 1 SW 2 SW 3 | SW 101 SW 106 | |
| Subtask 9 | QC of assembly | | Sensor S1 Sensor S2 Process table Vision System | SW 7 SW 8 SW 9 | SW 108 SW 109 | |
| Subtask 10 | Pick assembly A + B + C | Place in buffer area 4 | Manipulator Gripper Vision System | | | |

The Software Modules 4 listed (SW 1, 2, . . . ) typically are, depending on the associated Hardware Modules 3, drivers, control algorithms, signal processing, video processing, etc.

At this stage, the BOS will determine the minimal number of components required in the Production cell:
2 process tables
At least 2 effectors
At least 1 manipulator
At least 4 buffer areas
A vision system
At least 2 sensors 4. Characteristics to Specify Hardware and Software, Determining Lists of Possible Hardware and Software Process Table The process table characteristics can be determined from the subtask descriptions in the following way: requirements on the characteristics are calculated from each subtask. The BOS compiles the requirements for all subtasks in which the process table is involved and determines the characteristics that satisfy all requirements.

Process Table 1
  Subtask 1: the size of the part A will involve a process table minimum size of 300*400 mm, and the minimum load to be supported by the process table is 880 g (if several parts are to processed in parallel, the minimum requirements will increase accordingly).
  Subtask 2: the size of part B implies a minimum process table size of 30*30 mm, and a minimum load of 250 g.
  Subtask 3: the size of part C implies a minimum process table size of 20*20 mm, and a minimum load of 5 g.
  Subtask 4: the minimum process table size is 400*400 mm as it must accommodate part A and part B side by side. The minimum load to be supported by the process table is then 1030 g.
  Subtask 5-6-7: the minimum process table size is 400*400 mm as it must accommodate part A and part B and part C side by side. The minimum load to be supported by the process table is then 1035 g.
  For all subtasks, the involvement of human workers implies a process table height between 900 and 1200 mm.

Then the BOS will take into account the highest load requirement (1035 g) and the largest size required (400*400 mm), and a minimum height of 900 mm. The process table 1 PT1 must be qualified for work in a clean room. The BOS will search for a process table with those characteristics in the Inventory, and will return, for example, the 20 closest results matching those requirements.

The same is done for Process Table 2.

Buffer Areas

The BOS defines an arbitrary buffer area size for a reasonable number of parts, considering that the buffer areas can be fed during the task without interruption of the process. The size of buffer areas may vary from one part to another. Nevertheless for calculations of the manipulator size or reach, the size and location of the largest buffer area is considered. For example, 25 parts A stacked together: require a volume of 180*320*1125 mm$^3$. The BOS calculates and optimizes the space required for the buffer area.

Manipulator

The manipulator type is defined according to the characteristics given.

| Subtask 1 | | |
|---|---|---|
| Movement Tolerances | Pick 0.5 mm | Place 0.5 mm |
| Subtask 2 | | |
| Movement Tolerances | Pick 0.5 mm | Place 0.5 mm |

-continued

| Subtask 3 | | | |
|---|---|---|---|
| Movement Tolerances | Pick 0.5 mm | Place 0.5 mm | |

| Subtask 4 | | | |
|---|---|---|---|
| Movement Tolerances | Pick 0.5 mm | Place 0.5 mm | |

| Subtask 5 | | | |
|---|---|---|---|
| Movement Tolerances | Pick 0.5 mm | Place 0.5 mm | hold 0.2 mm |

| Subtask 6 | | | |
|---|---|---|---|
| Movement Tolerances | hold 0.2 mm | Screw-in 0.1 mm | |

| Subtask 7 | | | |
|---|---|---|---|
| Movement Tolerances | hold 0.2 mm | Screw 0.5 mm | |

| Subtask 8 | | | |
|---|---|---|---|
| Movement Tolerances | Pick 0.5 mm | Place 0.5 mm | |

| Subtask 9 | | | |
|---|---|---|---|
| Movement Tolerances | Pick 0.5 mm | Place 0.5 mm | |

| Subtask 10 | | | |
|---|---|---|---|
| Movement Tolerances | Pick 0.5 mm | Place 0.5 mm | |

Here data are expressed in absolute values, but percentages are also possible.

The BOS detects that subtasks 1, 2, 3, 4, 5 and 6 requires the same type of Hardware Module 3. Accuracy required to perform subtask 6 is nevertheless much higher than for other tasks and within the Inventory 2, it is recorded as being performed by human workers in 62% of the cases known to the Inventory 2. As a result, the BOS proposes two alternatives:
  With highly accurate manipulator and gripper incorporating highly accurate sensors.
  With human workers.

Manipulator Matching Subtasks 1 to 6:

Knowing the parts, the number of cycles, and movements characteristics, the BOS can determine the technical requirements for the manipulator: motors, torques, stiffness, material, etc. When doing so, it can determine the minimum requirements in terms of space, force, movements, etc. . . .

The BOS calculates from the data given that if the buffer areas are at the same height as the process table, the manipulator needs 1 less degree of freedom. In our example, the BOS will look for a static manipulator having 3 degrees of freedom with a minimal arm extension of 800 mm to cover the process table 1 size with a buffer area size covering at least the size of the larger part (part A). The tolerances for each subtask are considered. The BOS can:
  first evaluate manipulators matching the minimum requirements, and look for additional software to upgrade the manipulators to the higher upset requirements.
  secondly, evaluate manipulators matching the minimum requirements, and offer the option to implement the most critical subtasks, that is, those with high requirements that are difficult to satisfy, by human workers.
  then evaluate manipulators matching all requirements.

The BOS will return the 20 closest results matching those requirements.

The motion paths of the manipulator are not defined in the design phase, as they are determined and adapted on the go during planning and execution.

Effectors

The effector type is also defined based on:
  the process definition (information given by teaching/vision mode)
  the size of parts (information given by CAD)
  the environment (information given by operators)
. . .

Effector: Gripper

The characteristics of the parts and of the movements are integrated into calculations by the BOS to determine the required force, size, material, etc. The BOS will then determine from the Inventory the 20 most relevant results. The BOS can display this list of relevant grippers and also compatible manipulators and Software Modules 4.

Effector: Screwdriver

For subtask 6: The BOS knows from the inventory that this tasks is in 62% of the cases done by human workers. The BOS will first search solutions in which human workers complete the subtask. It will secondly propose alternatives with effectors, in case human workers are not available.

For subtask 7: The characteristics of the parts and of the movements are integrated into calculations by the BOS to determine the required force, size, material, etc. The BOS will then determine from the Inventory the 20 most relevant results. The BOS can display the list of relevant screwdrivers and also compatible manipulators and Software Modules 4.

Vision System and Sensors:

The same procedure as in the above examples is applied.

5. Refinement of the Selection

Based on the set of lists made for all the components of the production cell, the BOS can compare the compatibility between the Hardware Modules 3 themselves and between Hardware Modules 3 and Software Modules 4, and determine a list of possible combinations, as well as a list of "compatibilisers".

Compatibilisers are Hardware Modules 3 or Software Modules 4 that enable the compatibility of two elements which are initially not compatible. For example, they are manufactured by competitors.

From the set of lists, the BOS can also find in the Inventory 2 existing production cells which match most of the most important criteria and that have open capacities. Based on this, it provides the possibility to externalize and subcontract production.

| | Solution A | Solution B | Solution C | Solution D |
|---|---|---|---|---|
| Process Table 1 | Ref. PT. 53 | Ref. PT 57 | Ref. PT603 | Installation from third party-ID no XP16846 |
| Process Table 2 | Ref. PT 28 | Ref. PT 176a | Ref. PT52 | |
| Manipulator | KR AGILUS sixx | Cobra s600 SCARA robot | UR10 sensitive robot | |
| Gripper | FESTO gripper | ROBOTIQ sensitive gripper | Schunk gripper | Located in Spain |
| Screwdriver | SD-622 | SD-622 | SD-622 | |
| Sensor 1 | Festo torque sensor | — | — | |
| Sensor 2 | Festo force sensor | — | — | |
| Vision system | Microsoft Kinect | Datalogic | Cognex 3D | |
| Compatibilisers HW | CHW-681 | CHW-916 | CHW-011 | |

-continued

|  | Solution A | Solution B | Solution C | Solution D |
|---|---|---|---|---|
| Compatibilisers SW | CSW-681 | CSW-384 | CSW-011 |  |

The solution D using an external installation is not described in detail to the end-user for confidentiality reasons.

6. Final Selection

The final selection involves a selection according to user-defined criteria, such as:
- Re-use of in-house assets
- Time to start production
- Costs of the installation
- Amortization, $CO_2$ footprint, energy consumption, maintenance frequency, etc. . . .

In this case, the BOS will compare each solution to the list of existing assets already in-house, their availability and their maintenance schedule. The solution chosen will give priority to the in-house assets. The BOS can also optimise the overall timeframe and costs associated to the completion of a production cell, or provide the information that allows the user to make a choice.

|  |  | Solution A | Solution B | Solution C | Solution D |
|---|---|---|---|---|---|
| Existing HW and SW |  | 5/32 | 3/32 | 0/32 | 30/32 |
| Time to start production | Buying | 80 days | 85 days | 125 days | — |
|  | Renting | 7 days | 8 days | 10 days | 3 days |
| Initial Costs | Buying | 120 KCHF | 180 KCHF | 400 KCHF | — |
|  | Renting | 20 KCHF | 25 KCHF | 30 KCHF | 120KCHF |
| Time to produce 100'000 parts | Buying | 120 days | 123 days | 158 days | — |
|  | Renting | 47 days | 46 days | 43 days | 41 days |
| Costs per part produced* | Buying | 0.125 CHF | 0.136 CHF | 0.183 CHF |  |
|  | Renting | 0.175 CHF | 0.135 CHF | 0.148 CHF | 0.133 CHF |

*For a production of 100'000 parts as defined initially- when production starts.

In this case, human operators can choose the most efficient solution for the production cell. Depending on their priorities, Solution B and renting hardware and software may be the most efficient solution. For the sake of simplicity, the required elements are either bought or rented. In other cases, some may be bought and some may be rented to optimise the time to start production and/or the overall costs. Please note, that this comparison to "assets in-house" can also be done at step 4, and proposed solutions built on the existing assets.

7. Map the Solution

In order to support the realisation of the production cell, the BOS generates a mapping of the integration of the different elements, that is, their physical layout and configuration, and of infrastructure requirements like power source, light specifications, etc. The positioning of the equipment is based on the position of the reference point which is here the position of the middle of the Process Table 1. The BOS also can generate a list of orders to be placed, and book the required existing assets in the system for the planned production period. If the solution of subcontracting is chosen, this step can be skipped: The BOS may issue an order to the ERP for the reservation of the installation in Spain.

8. Update the Inventory

The new production cell is connected and registered in the Inventory 2 for collecting data generated during production. Then, by calculating performance and comparing it to data available in the Inventory 2, the BOS can propose optimizations of the process. New pieces of software or new hardware used in a specific configuration can be added to the Inventory 2.

Generally, the size and capabilities of the production cell are not necessarily limited to one task. It has been simplified for the sake of clear explanations. The design method can be applied to a single production cell or to an entire plant, in each case for just one task or for a collection of tasks. Designing or re-designing a plant or production cell, including the implementation of modifications, can be done while they are running. Likewise, planning and implementing plans can be done while the system is running, with the implementation of plans opportunistically using hardware and other resources when they become available.

In embodiments, the algorithm is different: The Inventory 2 can also store configurations of production cells corresponding to process definition. Based on this, to design a new production cell, the BOS can search the Inventory for a design of a production cell corresponding to the process definition. Then the BOS can make adjustments, thereby copying and modifying the production cell set-up.

Choosing Hardware and/or Software According to Requirements on Accuracy, Speed, Optimising Production Cost Per Unit, Etc According to embodiments, the target of the system is not primarily related to speed of production or production cost per unit. Rather, a target is to produce as early as possible, even in a suboptimal mode. For this, the end-user defines critical criteria in terms of a acceptable ranges which need to be matched during production. For example, in step 4 of the design method (determining lists of possible hardware and software) the criteria can be classified according to their importance or priority:
- Class A: must have—first priority
- Class B: must have—second priority
- Class C: "nice to have"—third priority
- Class D: optional The BOS will search within its initial list of potential Hardware Modules 3 and Software Modules 4 for those that match the class A criterion. From the resulting subset, a reduced subset is generated, comprising the modules that also satisfy the class B criterion. Class C and D criteria may not be fulfilled in a first iteration. If this is the case, then depending on user input, the BOS can search for modules that are not in-house, or suggest relaxing the requirements. This can be done by relaxing requirements on e.g. production speed, cost, etc.

For example, a subtask requires a manipulator with the following specifications:
Accuracy: 0.2% deviation allowed
Speed: 1% deviation allowed
Weight: maximum 150 KG+/−1%

The priority of Accuracy is a class A criterion; whereas, speed is a class B criterion, and Weight is a class C criterion. The BOS will start the search for manipulators with respect to class A. Then it will select amongst the subset of manipulators matching the accuracy requirements those that match the speed requirements (class B criterion). From the resulting reduced subset of Manipulators matching the class A and B criteria, the BOS selects those which matches also criterion C: weight requirements. When the BOS does not find any results matching criteria A AND B AND C, BOS can propose some compromises on criterion C: for example, the tolerance for the maximum weight is extended to 5%. And then BOS can propose relevant solutions that will satisfy the most important requirements.

Incorporating New Software when Hardware Accuracy is Reduced

Parameters of the Hardware Modules 3 can be determined by estimation or measurement during operation, and/or in dedicated calibration procedures. At some time, it may be found that achieving an adequate accuracy is no longer possible. This can involve the following steps:

1. Determining a parameter and comparing it with requirements.
2. Determining if the parameter which does not fulfil requirements is critical, for example, based on the priority class of a criterion related to the parameter.
3. If it is a critical parameter, a then search within the Inventory 2 for a set of Software Modules 4 able to provide correction or compensation of errors. Within the set, the Software Module 4 is selected which allows correction or compensation of errors caused by or related to said parameter.
4. If a Software Module 4 matches the requirements, it will be "plugged" into the BOS and used in operation of the system.
5. IF no Software Module 4 matches the requirements, the closest Software Module 4 identified in terms of the requirements is selected. The BOS indicates the need for improvement of the software or the missing software type to the End-user or to a community programming platform.

Choosing a Hardware Module 3 Module According to its History

In the course of the process of designing the robotic system, it may be necessary to choose between available assets, in particular Hardware Modules 3, that are available in-house and/or from remote locations. According to embodiments, this is done by the steps of retrieving, e.g. from specifications provided by the end-user, a number of cycles to be performed by the Hardware Module 3. This number can be determined, for example, from a number of units to be produced in a production run for which the design is intended, and from a number of cycles required for each unit. The latter can be determined by simulating operation of the Hardware Modules 3 for production.

retrieving, from the historical data of the suitable Hardware Modules 3 that are available, when maintenance actions were performed and when the next one is scheduled.

comparing the number of cycles to be performed to the number of remaining cycles before the next maintenance of each suitable Hardware available. Depending on the results for each Hardware Module 3, the BOS can choose a combination of Hardware Modules 3 that allows to perform the complete production run without maintenance, or with maintenance times of multiple Hardware Modules 3 being at the same time, minimising overall downtime, or by distributing production over several production cells, or by choosing Hardware Modules 3 that requires less maintenance.

One or more or all steps or selecting Hardware Modules 3 can be performed by expressing the selecting problem as a multivariate optimisation problem, wherein parameters to be varied are one or more of selection of type and identity of Hardware Modules 3;
allocation of Hardware Modules 3 to one or more production cells;
allocation of workload to these production cells;
when to perform maintenance;
performance criteria;
user-defined criteria.

Choosing a Hardware Module According to Historical Data from Others of the Same Type Historical data of hardware modules 3 are collected in the inventory. Using this data, for each Hardware Module 3 one or more of the following parameters can be determined, and also statistical values derived from these parameters:

the selling price
the deviations over time per parameter
the number of predictive maintenance events
the time spent for maintenance
the downtime of the production cell caused by the Hardware Module 3
the average number of parts to be replaced
the average energy consumption
the most sensitive parts within the Hardware Module 3 (being replaced most often)
the costs of overall maintenance (number of maintenance, time of maintenance, costs of spare parts, . . . )
the overall cost of operation of the Hardware Module 3, including price, energy consumption, overall maintenance costs, . . .

The parameters and associated statistical data are also considered to be historical data. The Inventory can collect the data not only individually, associated with each unique piece Hardware Module 3, but also for each Hardware Module 3 type. Such Hardware Module 3 type data can comprise averages and other statistical parameters that characterise parameters or historical data collected from a plurality of Hardware Modules 3 of the same type.

When designing a production cell, the BOS can choose Hardware Modules 3 according to different user-defined criteria: immediate availability, costs, etc. Thanks to the inventory, it is be possible to have a more global and integrated overview of the real costs of operation, including maintenance costs, energy consumption, downtime, etc. and the manner in which the costs depend on the choice of individual Hardware Modules 3.

In the design phase, the BOS can output, in the step of "final selection of the Production Cell", the list of required Hardware Modules 3 together with their overall costs per module, and optionally also a correlation between the choice of a Hardware Module 3 and the total cost of operating the entire production cell, helping the end-user to make an optimal choice.

Scheduling Preventive Maintenance According to Historical Data from a Hardware Module 3 Module and/or from Data of Others of the Same Type As already stated, the Inventory 2 can collect historical data related to Hardware Module 3 types. With regard to maintenance, this can include maintenance periods, parts involved, number of cycles performed between maintenance events, cause of maintenance, data describing repairs, etc. Corresponding statistical data (computed by the BOS or by the Inventory 2) per type of HW can be used to determine adequate intervals, e.g. in terms of time or cycles, for predictive maintenance, as well as tasks which need to be performed for maintenance.

Once a production cell is set-up for production, the BOS has access to the number of cycles performed by each individual Hardware Module 3—characterised by a unique hardware identifier (ID)—as well as the number of cycles which still needs to be performed. For each individual Hardware Module 3, the number of cycles performed in comparable conditions can be compared to the average number of cycles performed by the same type of Hardware Module 3 between two maintenance events. From this, an expected number of remaining cycles per Hardware Module 3 until the next maintenance event can be determined. To minimise downtime, the BOS can anticipate and schedule transferring production to another production cell when scheduling the next planned maintenance, or coordinate maintenance operations for all modules involved in production to take place at the same time.

In embodiments, the inventory 2 can also collect and associate historical data in association with a particular configuration of Hardware Modules 3, for example, for a robotic assembly 3c comprising several manipulator modules 33. Such robotic assemblies can be considered to be of the same type if they are made of Hardware Modules 3 of the same types in the same configuration. Then, for a type of robotic assembly 3c, the BOS can collect, analyse and compare, in association with conditions of use—such as the type of tasks—historical data from all concrete instances of this type. It can then estimate when failure of the robotic assembly 3c can occur: for example, in a particular configuration, joint No. 2 fails after 9746 movements handling an average load of 21 kg. Once new system with a comparable configuration is installed, the BOS can plan the maintenance of the equipment. In the case of planning, the BOS may choose to use a robot of a particular type only if the remaining estimated number of cycles to be performed is high enough to perform the task or subtask required for the whole production run.

Integrate HW Modules from Different Manufacturers Because They Have a Standardised Interface and Models that can be Used in Planning The interface to the BOS is known and different manufacturers have their own interfaces. An integration provider or a user community or hardware manufacturers can develop Software Modules 4 that makes the Hardware Modules 3 compatible for communication with the BOS.

Figure 8:
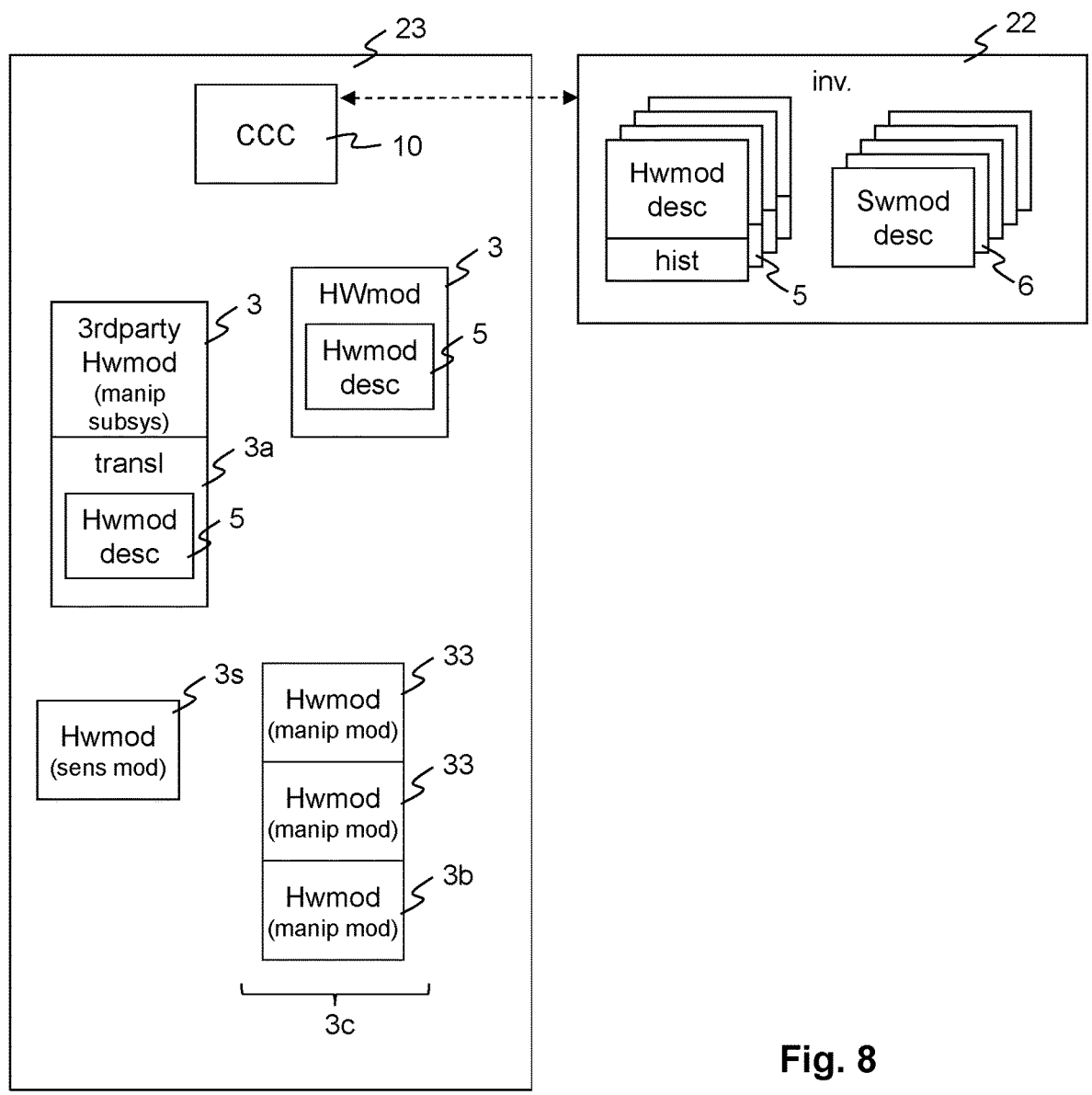
FIG. 8 shows the structure of a standalone or autonomous system.

FIG. 8 shows the structure of a standalone or autonomous system 23, comprising Hardware Modules 3 with Hardware Module Descriptions 5, wherein the Hardware Modules 3 can be sensor modules, manipulator modules 33 etc. as already described earlier. These form pluggable modules with embedded intelligence and sensors. They have the ability to collect and store their own data. The autonomous system 23 also comprises a central computation and command unit 10 (CCC). The CCC is configured to perform the following functions

- automatically determine the physical configuration of the hardware modules 3 and build a kinematic model coordinate transformation
- integration of historical data collected in the Hardware Modules 3 and performing calculation for predictive maintenance
- occasional, intermittent connection to an external repository 22 such as an Inventory 2, to receive updates, and—depending on user preferences and contractual agreements with other parties—upload and download historical data, and data derived therefrom, in particular current data related to the planning of predictive maintenance.

Communication interfaces and protocols between the CCC 10 and pluggable hardware modules 3 are standardised. The CCC 10 can implement functions for predictive maintenance and/or for configuration of an installation in view of specific tasks.

Sensors:

Two types of sensors can be present in the Hardware Modules 3:
- for internal measurements, related to properties of Hardware Modules 3: mainly this is the state of actuators that are part of a module (e.g. link angle). In addition this can be vibration, acceleration, sound, temperature, humidity within the Hardware Module 3, etc.
- for environmental measurements, related to properties of the environment: temperature, humidity, radiation, etc. Such information can be used, for example, for quality control or for adapting operation of the system to environmental conditions.

Data associated with the Hardware Modules 3, in particular sensor data, but also operational data and maintenance related data, generally collected data, comprising status data and operating data, can be logged in the Hardware Modules 3. Based on current updates from the external repository 22, the CCC 10 knows how the pluggable hardware modules 3 can be used or have to be maintained. Data can be sent via the CCC to the external repository 22 for extended services, e.g. to improve the collective knowledge base, however this can be optional to ensure data security.

Determining an Optimized Installation for a Specific Activity (Configuration Tool)

The following functionality can be part of an online tool and store in which an end-user can configure an autonomous robot system 23 with Hardware Modules 3 that are available in-house, optionally and if necessary involving additional Hardware Modules 3. The following steps can be executed:
1. Optionally, setting-up or logging into an account which is associated with:
   end-user personal data, billing data, etc.
   end-user facility location, optionally several locations with Hardware Modules 3 stored there, thereby allowing to take into account different levels of delivery time.
   optionally a list of the existing assets currently installed: production cells, robotic assemblies 3c, sensors, etc.
   technical domain to which production is related, thereby allowing to automatically link to relevant regulations.

If the end-user does not have any account, the tool can still be made available for use, but with limited functionalities or with restrictions. For example, the end-user may not have their existing pluggable modules loaded into the system. Then the system will not build a solution using on the end-user's existing assets.

2. Describing the targeted new production system by giving inputs:
   Environmental inputs: working environment (humidity, temperature, . . . ), acceptable degree of collaboration with human beings
   Target task definition, e.g. as described above in relation to the general design method: in terms of process definitions and of actions. By assistance of a simulation tool with a visual interface, for example, the user can be enabled to virtually plug different hardware modules 3 together to build a manipulator as a robotic assembly 3c, and then by specifying parameters and the tasks to be performed, the configuration tool will return a more accurate description of each required hardware module 3.
   Regulations, for example, for work involving humans.
3. All functionalities of the CCC are also included in the configuration tool. The CCC processes the above inputs in relation with its data and in combination with an occasional connection to the external repository 22 to propose a set of the required Hardware, and its configuration, enabling optimization of a user-defined criterion. The process can be as in the process described with regard the design of a production cell in general, but with different constraints: one goal is to use existing Hardware Modules 3 (in-house or belonging to the end-user's company), and the Hardware Modules 3 are mainly pluggable manipulator modules 33 which allow to assemble robotic assemblies 3c in different configurations.
4. Simulating the targeted task according to the process definition and the other inputs. The end-user can use the results of the simulation to validate the configuration and, if necessary, modify the input. This leads to a modified configuration, and the process is repeated. Iteratively modifying the configuration and simulating can be repeated automatically in order to find an optimal solution.
5. Optionally, Simulation of the final solution. Again, the end-user can use this to validate the configuration and, if necessary, modify the input.

The result of the configuration process is the physical configuration of the Hardware Modules 3 and—if necessary—a set of further Hardware Modules 3 that need to be acquired.

Example

The following task is to be performed:
A manipulator shall be used for transporting an assembly from point 1 to point 2.
At point 2, a person will take the assembly to work with it. It follows that there is a need for a collaborative robot.
The distance between point 1 and 2 may vary from 2 m to 4 m. It follows that there is no need for a mobile robot.
At point 2, the manipulator must place the parts on the floor relative to other parts with an accuracy of 1 mm.
The assembly is a part made of wood panel measuring 300×300 mm and weighting 25 kg. The top surface is varnished.
The process will take place in a facility in Colombia. It follows that there will be a relative humidity of 90% and temperatures from 28-35° C.
The robot must repeat the transportation movement 2000 times.
From these parameters, the design tool will determine:
The manipulator is the reference point of a Cartesian coordinate system and is set up in the middle between point 1 and 2.
The manipulator is made of a basis, labelled module M0—which could also be on wheels—and the additional modules are labelled M1, M2, M3, M4 . . . , the number relating to their position after M0 when assembled to form a manipulator module 33. The last module is the effector.
The configuration or design tool refers to its database, and determines:

| Information | Calculations | Results/Issue | Example |
|---|---|---|---|
| Distance from point 1 to point 2 Movement type | Minimum degree of freedom Range size of the whole Manipulator | Minimal number of modules Minimal size of modules | 6 M0 = 1 m (size L) M1 = 1 m (size L) M2 = 0.8 m (size M) M3 = 0.8 m (size M) M4 = 0.5 m (size S) M5 = 0.5 m (size S) |
| Weight to be lifted and transported | Torque of joints Strength of arms Payload of 25 Kg | Motor power Material and size for <<arm>> - modules | 500 W Aluminium (ex 1.100)- minimum thickness: 12 mm M0 = 1 m (size L) M1 = 1 m (size L) M2 = 0.8 L(size M) M3 = 0.8 m (size M) M4 = 0.5 m (size S) |
| Cadence: 2000/day | Speed of motors Strength of the HOLDER | Motor power Specification for M0 Weight Size Material | 2500 W M0 125 Kg Size M Stainless steel 316L |
| Environmental conditions Temperature | Dilatation | Type of material for modules and effector | Aluminium (ex 1.100) - minimum thickness: 12 mm |
| Humidity | Corrosion | Type of material for modules and effector Type of motors | Aluminium - ex 2014 (better resistance to corrosion) Motor protection class IP65 |

-continued

| Information | Calculations | Results/Issue | Example |
|---|---|---|---|
| Task specification: Holding and Placing Part characteristics: non-porous | Effector type Gripper →A Vacuum gripper →A Rotative gripper | Minimal workload Minimal amount of suction point Minimal size Modules enabling pumping Pump Characteristics | 25 Kg 5 50 mm diameter |
| Accuracy 1 mm Human collaboration | Effector type Motor type Sensor type Standards for motor speed regulations | Link angle accuracy | Module grades |

The design tool need not display to the end-user the level of information described in the 4th column.

The design tool utilises a connection to the external repository 22 to have access to the database of possible modules to be acquired. It will then issue a first list of possible modules.

| Module | Characteristic | Matching |
|---|---|---|
| M0 | Vacuum pump Stainless Steel -125 Kg Size L | Holder ref: LH401 |
| M1 | Size L Joint with compliance (for collaboration with humans) Aluminium 2014 Enabling suction | Module ref: L3151 |
| M2 | Size M extension Aluminium 2014 Enabling suction | Module ref: LE101 |
| M3 | Size M Joint with compliance Aluminium 2014 Enabling suction | Module Ref: M3141 |
| M4 | Size S Joint with compliance Aluminium 2014 Enabling suction | Module Ref: S3141 |
| M5 | Size S Effector Compliant Type Number of touching points | Module Ref: SE1V5 |

Reference numbers in the third column are coded, and signify (where not all attributes may apply to all types of modules):
1st letter: size
2nd FIG.: joint (different figures in case of human collaboration) or extension or holder
3rd FIG.: material
4rth FIG.: type of motor
5rd FIG.: inner hole for fluid transportation The CCC can then simulate operation of the robot assembly with the selected modules and check that when simulating the realisation of subtasks, the simulated performance matches requirements.

Then the CCC, automatically or under control by the end-user, could add or remove one degree of freedom, perform a second iteration of simulation, and compare the results.

As already stated, the above configuration functionality of the CCC connects to an external repository 22 in order to retrieve information on further Hardware Modules 3 that are not available to the end-user in-house. If it is determined that such further Hardware Modules 3 are needed, the external repository 22 can provide functions of a shop or web shop, allowing the end-user or the CCC to order delivery of such further Hardware Modules 3. The CCC and/or the external repository 22 can be implemented by means of web platforms. The functionality of the external repository and that of the CCC can be integrated so that the end-user sees only a single interface.

While the invention has been described in present embodiments, it is distinctly understood that the invention is not limited thereto, but may be otherwise variously embodied and practised within the scope of the claims.

The invention claimed is:

1. A method for operating a robotic system, wherein the robotic system comprises a given set of concrete Hardware Modules and Software Modules, and wherein a location of the concrete Hardware Modules in space is known, the method comprising steps for planning operation of the robotic system by
   maintaining a computational model of the robotic system;
   inputting a target task, the target task comprising an entry status and an output status of a product that is to be manufactured by the robotic system;
   retrieving a process definition that specifies subtasks for accomplishing the target task, wherein each subtask either:
      specifies actions, with each of the actions being associated with required Hardware Modules and/or Software Modules that are able to accomplish the subtask; or
      is split up by specifying further subtasks that are recursively split up into yet further subtasks and finally into the actions;
   determining concrete Hardware Modules and Software Modules of the robotic system that matches the required Hardware Modules and/or Software Modules, while determining whether actions specified by the process definition can be performed by available concrete Hardware Modules from a list of available concrete Hardware Modules: and, in case the available concrete Hardware Modules cannot perform the actions, determining additional Hardware Modules to form a combined set of additional and available Hardware Modules as the concrete Hardware Modules that can perform the actions specified by the process definition;
   performing the actions with the concrete Hardware Modules and Software Modules, with mutual dependencies of the actions resulting from the recursive splitting up of the task into the subtasks and the actions.

2. The method according to claim 1, further comprising the steps of
- while performing the actions with the concrete Hardware Modules and Software Modules, determining a current status of products;
- performing the steps for planning operation of the robotic system, thereby using the current status of products as the entry status.

3. The method according to claim 1, further comprising the steps of
- while performing the actions with the concrete Hardware Modules and Software Modules, determining a current status of the concrete Hardware Modules;
- performing the steps for planning operation of the robotic system, taking into account the current status of the concrete Hardware Modules, thereby allocating the concrete Hardware Modules to actions as production progresses, adapting the allocation to an evolving production process.

* * * * *